(12) United States Patent
Bader

(10) Patent No.: US 7,093,663 B1
(45) Date of Patent: Aug. 22, 2006

(54) METHODS TO SOLVE ALKALINE-SULFATE SCALES AND RELATED-GASES PROBLEMS

(76) Inventor: Mansour S. Bader, P.O. Box 10675, College Station, TX (US) 77842

( * ) Notice: Subject to any disclaimer, the term of this patent is extended or adjusted under 35 U.S.C. 154(b) by 290 days.

(21) Appl. No.: 10/737,727

(22) Filed: Dec. 16, 2003

Related U.S. Application Data

(63) Continuation-in-part of application No. 10/094,562, filed on Mar. 8, 2002, now Pat. No. 6,663,778, which is a continuation-in-part of application No. 09/416,320, filed on Oct. 12, 1999, now Pat. No. 6,365,051.

(51) Int. Cl.
*E21B 43/22* (2006.01)

(52) U.S. Cl. ............... 166/371; 166/279; 166/300; 166/309; 166/310

(58) Field of Classification Search ............... None
See application file for complete search history.

(56) References Cited

U.S. PATENT DOCUMENTS

| | | | |
|---|---|---|---|
| 4,366,063 A | 12/1982 | O'Connor | |
| 4,476,024 A | 10/1984 | Cheng | |
| 4,545,862 A | 10/1985 | Gore et al. | |
| 4,728,397 A | 3/1988 | Kjellander et al. | |
| 4,781,837 A | 11/1988 | Lefebvre | |
| 4,818,345 A | 4/1989 | Jonsson | |
| 4,879,041 A | 11/1989 | Kurokawa et al. | |
| 4,973,201 A * | 11/1990 | Paul et al. | 405/264 |
| 5,098,566 A | 3/1992 | Lefebvre | |
| 5,102,550 A | 4/1992 | Pizzino et al. | |
| 5,269,944 A * | 12/1993 | Kerollis et al. | 210/754 |
| 5,587,088 A | 12/1996 | Bader | |

* cited by examiner

Primary Examiner—Zakiya W. Bates

(57) ABSTRACT

Methods for the removal of alkaline and sulfate scales from aqueous saline streams such as seawater, oil-gas fields produced waters, formation waters, and the like. Such processing methods can also be extended for the simultaneous removal of hydrogen sulfide, and/or sulfur dioxide, and/or oxides of nitrogen, and/or carbon dioxide from gaseous streams. The same processing concept with modified methods can further be employed for the removal of gases such as radon, hydrogen sulfide, sulfur dioxide, oxides of nitrogen, and carbon dioxide from gaseous streams.

59 Claims, 9 Drawing Sheets

METHODS TO SOLVE ALKALINE-SULFATE SCALES AND RELATED-GASES PROBLEMS

BACKGROUND OF THE INVENTION

Water injection operations for flooding (to sweep oil to the producer), for pressure support (to fill the voidage left by the produced fluids), and/or for disposal are becoming a key element in modern oil-fields operations and the like. For flooding and pressure support applications, water from at least three possible sources can be used in injection operations. These sources are seawater, produced water, and saline aquifers water. FIG. 1 depicts possible schemes for water injection operations using such sources of waters. Table 1 presents examples of the three possible sources of waters for injection operations.

Seawater injection is the most common option, particularly in offshore and near coastal oil-gas fields operations. This is attributed to its abundance and acceptable compatibility with the salinity of most reservoirs formation waters. Seawater contains traces of suspended matters, bacteria, oxygen, alkaline scale, and more importantly appreciable concentrations of sulfate. Thus, seawater requires extensive pretreatment using standard processing equipment (coagulation with poly-electrolytes, multimedia filtration, disinfection with hypo-chlorite or biocide or ozone, oxygen removal, and in some cases acid treatment). Such a pretreatment, however, excludes the selective removal of sulfate.

As used herein and in the claims, the term "seawater" includes both ocean water and seawater and the term "sea" includes both seas and oceans.

Re-injection of produced waters is another option. As environmental regulations continue to evolve, the reuse, rather than the discharge of produced waters to surrounding environment, becomes an attractive option for injection operations. This option is favored in reservoirs where water injection is being considered for pressure support, particularly when the amounts of produced waters are in the range of 50% or more of the total fluids produced (mature oil-gas fields). However, re-injection of produced water alone can not provide reservoir voidage replacement especially when watercuts are relatively low. In such cases, produced waters must be supplemented with seawater or aquifers water. Moreover, the loss of reactive gases will change the composition and pH of the produced waters, and thus creating a potential compatibility problem when produced waters are re-injected. Furthermore, re-injection of produced waters could reduce injectivity due to its oil content, particle content, and temperature.

The third possible option is to employ saline waters from nearby aquifers (e.g., onshore subsurface brine waters aquifers or below seabed offshore brine waters aquifers) that are not related to oil-gas fields produced waters. Aquifers waters are biologically clean and depleted of oxygen. Temperatures of subsurface waters are in most cases almost close to temperatures of surface waters. Thus, they do not require extensive pretreatment as the cases with seawater and produced waters. However, some of such waters contain gases (e.g., carbon dioxide, hydrogen sulfide, methane, etc.) which would necessitate a gas removal facility. Furthermore, aquifers waters are in most cases insufficient as a stand alone source of waters, and thus can be supplemented with either produced waters or seawater to provide the needed amounts for injection operations.

The availability of waters in a sufficient quantity when and where needed, and with adequate quality (e.g., compatible total salinity and acceptable injectivity) are the apparent factors that determine the use of such waters for injection operations. However, any mixing of incompatible waters without selective removal of scale causing species, particularly sulfate in the forms of sparingly soluble alkaline cations (calcium, strontium, and barium) will result in a wealth of operational problems and difficulties, which in turn, will lead to additional capital and operating costs.

FIG. 2 depicts possible locations of scale deposits throughout the flow paths of water. Scale deposits could take place: (1) at the surface water injection facility where incompatible sources of water are mixed prior to injection; (2) around injection wells where the injected water starts to mix with the reservoir formation water; (3) deep downhole in the reservoir where the injected water displaces reservoir formation water; (4) deep downhole in the reservoir where the converged injected water and formation water are about to reach the range of producing wells; (5) deep downhole in the reservoir where the converged (injected and formation) waters are within the range of producing wells; (6) at the connection of a branched zone where each branch produces different water; (7) at the manifold of a producing zone where water is produced from different blocks within the same producing zone; (8) at topside facility where produced fluids are mixed from different production zones to separate oil and gas from produced waters, or in pipelines that transport produced fluids to on-shore processing facilities; and if applicable (9) at disposal wells where produced water is injected for final disposal.

The first problem is that sulfate scale deposits are hard, adherent, difficult to remove mechanically, and insoluble in mineral acids or other common solvents. Hence, such deposits could cause severe flow restrictions within the drainage radius inside the formation, within the wellbore, and in processing and surface equipment. The visible part of sulfate scale damages, which is the manageable part to some degree, can be seen within the operating equipment and surface processing facilities (e.g., stuck downhole pumps, plugged perforations and tubing strings, choked flowlines, frozen valves, etc.). However, sulfate scale deposits can also be accumulated within the invisible oil-bearing formation, which could cause the ultimate damage (permanent producing wells shut down).

The second problem is that in oil and gas fields, uranium (U-238 and U-235) and thorium (Th-232) are present in immobile chemical forms, whereas radium and its isotopes (their γ-emitting daughter nuclides) can easily be transported with chloride-rich formation waters. Once radium isotopes are leached from their lithological origin, they are no longer supported by their ancestors, and thus they develop their own decay series that refers to Naturally Occurring Radioactive Materials (NORM):

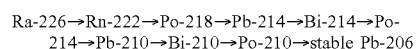

Ra-226→Rn-222→Po-218→Pb-214→Bi-214→Po-214→Pb-210→Bi-210→Po-210→stable Pb-206

Radium and its isotopes tend to co-precipitate with the sparingly soluble alkaline cations mainly in the forms of sulfate, or carbonate or silicate. As such, formation and produced waters can become radioactive due to the transportation of radium isotopes. External (near any processing equipment), and internal (during maintenance or workovers) radioactive hazards could exist due to NORM adherent to scale during processing. Direct costs of NORM-waste disposal include physical inspection, radionuclide analysis, actual disposal operation, transportation, container decontamination, and storage and decontamination of the removed equipment and pipes. In addition to these direct costs, long-term liability is another potential cost.

The third problem is that radon (Rn-222), the first radioactive decay product of radium, is transported from the reservoir to the surface via the gas phase. Radon can thus be found in the produced natural gas as well as in gas treating facilities (e.g., fractionators and natural gas liquid storage tanks). Due to its high solubility in organic liquids, radon also tends to be concentrated in the liquid phase. If radon is allowed to accumulate and decay (3.8 days half-life), then a serious health threat will exist. This is attributed to $\alpha$-radiation that results from the decay of the radon short-lived daughter products (polonium: Po-218 and Po-214). In addition, very thin layers of bismuth (Bi-214) and/or lead (Pb-214 and Pb-210) that emit $\gamma$-radiation can be formed at the inner surface of gas transport lines as well as gas treating and storage facilities.

The fourth problem is that in downhole, the thermophilic sulfate reducing bacteria converts sulfate to hydrogen sulfide, which leads to reservoir souring. Corrosion of both downhole and surface equipment can result from the production of hydrogen sulfide gas, and hence, sulfide-related workovers must be conducted. Hydrogen sulfide gas is also lethal at levels above 1000 ppm by volume (ppmv) for exposures over two minutes, and therefore, requiring installation of worker-health safeguards monitoring systems. Sour gas ought to be sweetened before it can be sold, and thus gas scrubbing or other treatment systems must be employed.

It is still a common practice unfortunately to use available water in injection operations regardless of the water's contents of scale forming species, and then attempt to correct the problems that occur. Remediation, in particular, of sulfate scale: (1) is very expensive; (2) tends to be a trial-error procedure and field specific (e.g., almost no two identical sets of scale forming conditions exist in any two different fields, and thus any remedial solution can not be generalized); (3) is successful only in less severe cases of scaling; and (4) may cause more problems than they solve under certain conditions (e.g., formation of pseudo scales and extreme emulsion problems).

In such a costly reactive approach, productivity decline due mainly to sulfate scales is accepted as an economic compromise. Rather than extensively stimulating producing wells (backflow, hydraulic fracturing, acid wash, or injection of chemical dissolvers) with long-term remedial costs, and in some cases with irreversible damages (e.g., within the invisible oil-bearing formation), water injection operations should be designed properly from the start, and if not, as typically the case, existed water injection operations ought to be corrected.

The difference in a given oil-gas field economical value with or without proper water injection operations represents the value of injected water. This value could be a liability as with the case of ill-planned water injection operations, or a benefit as with the case of well-planned water injection operations.

The liability of ill-planned water injection can be seen in the following forms: (1) extensive and costly scale remedial workovers; (2) substantial environmental impact and health hazards; (3) reduction in productivity index; (4) deferred oil production; and (5) permanent formation damage and ultimately wells shutdown. In these forms of ill-planned water injection operations, scale costs in the U.S. alone at minimum on the order of $50 billion/year.

The benefits of well-planned water injection, on the other hand, can be seen in the following forms: (1) optimum primary and secondary recovery of hydrocarbons under less severe conditions; (2) minimum formation damages; (3) minimum remedial workovers; and (4) minimum environmental liability and health hazards. As oil-gas reserves are depleted, the current economic environment demands that well-planned water injection be considered as a much-needed "operation" that generates additional revenue, rather than a much-resisted "cost".

Clearly, the best way to avoid scale problems is to prevent scale from forming. This approach would circumvent the problems incurred with scales build-up, adherence of radioactive species to such scales, radon emission, and reservoir souring by preventing these problems at the onset. This is much more economical than to contend with the damages caused by scale formation problems. This preventive and proactive approach requires some capital expenditures in the near-term time frame, but it will substantially reduce long-term capital and operating costs.

It is apparent that there is a definite need for reliable and efficient methods to remove: (1) sulfate from seawater before injection into formation water; (2) sulfate and/or other scale species from produced waters and/or aquifers waters before mixing with other incompatible streams of saline waters (e.g., seawater and/or reservoir formation water); (3) radon before it decays from natural gas streams; and (4) hydrogen sulfide and other acidic gases from sour natural gas streams and the like. This patent is focused on providing innovative processing methods for solving these problems.

SUMMARY OF THE INVENTION

In one aspect, the present invention provides a method of producing petroleum, gas, or other products from a subterranean formation using seawater. The inventive method comprises the steps of: (a) converting alkalinity in seawater to sulfate; (b) removing sulfate from seawater; and (c) injecting the resulting treated seawater product into the subterranean formation. Alkalinity in seawater is converted to sulfate in step (a) by (i) adding an acid gas in an amount sufficient to react with the alkalinity of the seawater; and (ii) adding a sufficient amount of ozone as a bactericidal and a strong oxidizer to accelerate the reaction of the acid gas with alkalinity to ultimately form sulfate. Sulfate is removed from seawater in step (b) by (i) adding an amine solvent to seawater to form a precipitate comprising the sulfate; (ii) removing at least most of the amine solvent from seawater by a stripping unit; and (iii) removing the precipitate from seawater to produce the treated seawater product. The acid gas that can be used in this invention is sulfur dioxide or oxidized hydrogen sulfide. The amine solvents that can be employed in this invention include isopropylamine, propylamine, diisopropylamine, ethylamine, diethylamine, methylamine, and dimethylamine.

In another aspect, the present invention provides a method of producing petroleum, gas, or other products from a subterranean formation using seawater. The inventive method comprises the steps of: (a) converting alkalinity in seawater to sulfate; (b) removing sulfate from seawater; and (c) injecting the resulting treated seawater product into the subterranean formation. Alkalinity in the seawater is converted to sulfate in step (a) by (i) adding an acid gas in an amount sufficient to react with the alkalinity of seawater; and (ii) adding a sufficient amount of ozone as a bactericidal and a strong oxidizer to accelerate the reaction of the acid gas with alkalinity to ultimately form sulfate. Sulfate is removed from the seawater in step (b) by (i) concentrating sulfate by membrane distillation; (ii) adding an amine solvent to the sulfate-concentrated seawater to form a precipitate comprising the sulfate; (iii) removing at least most of the amine solvent from sulfate-concentrated seawater by a stripping unit; and (iv) removing the precipitate from sulfate-concentrated seawater to produce the treated seawater product. The acid gas that can be used in this invention is sulfur dioxide or oxidized hydrogen sulfide. The amine solvents that can be employed in this invention include isopropylamine, propylamine, diisopropylamine, ethylamine, diethylamine, methylamine, and dimethylamine.

In another aspect, the present invention provides a method of producing petroleum, gas, or other products from a subterranean formation using seawater. The inventive method comprises the steps of: (a) converting alkalinity in seawater to sulfate; (b) removing sulfate from seawater; and (c) injecting the resulting treated seawater product into the subterranean formation. Alkalinity in seawater is converted to sulfate in step (a) by (i) adding an acid gas in an amount sufficient to react with the alkalinity of seawater; and (ii) adding a sufficient amount of ozone as a bactericidal and a strong oxidizer to accelerate the reaction of the acid gas with alkalinity to ultimately form sulfate. Sulfate is removed from seawater in step (b) by (i) concentrating sulfate by nanofiltration to produce sulfate-concentrated seawater, and nearly sulfate-free seawater; (ii) adding an amine solvent to the sulfate-concentrated seawater to form a precipitate comprising the sulfate; (iii) removing at least most of the amine solvent from the sulfate-concentrated seawater by a stripping unit; (iv) removing the precipitate from the sulfate-concentrated seawater to produce sulfate-treated seawater; and (v) mixing the nanofiltration nearly sulfate-free seawater from step (i) with the sulfate-treated seawater from step (iv) to produce treated seawater product. The acid gas that can be used in this invention is sulfur dioxide or oxidized hydrogen sulfide. The amine solvents that can be employed in this invention include isopropylamine, propylamine, diisopropylamine, ethylamine, diethylamine, methylamine, and dimethylamine.

In another aspect, the present invention provides a method of producing petroleum, gas, or other products from a subterranean formation using formation waters. The inventive method comprises the steps of: (a) converting alkalinity in formation water to sulfate; (b) removing sulfate from formation water; and (c) injecting the resulting treated formation water product into the subterranean formation. Alkalinity in formation water is converted to sulfate in step (a) by (i) adding an acid gas in an amount sufficient to react with the alkalinity of formation water; and (ii) adding a sufficient amount of oxygen as an oxidizer to accelerate the reaction of the acid gas with alkalinity to ultimately form sulfate. Sulfate is removed from formation water in step (b) by (i) adding an amine solvent to formation water to form a precipitate comprising the sulfate; (ii) removing at least most of the amine solvent from formation stream by a stripping unit; and (iii) removing the precipitate from formation water to produce the treated formation water product. Formation waters that can be used in this invention are oil-gas fields produced waters, methane coal-bed produced waters, aquifers waters, and the like. The acid gas that can be used in this invention is sulfur dioxide or oxidized hydrogen sulfide. The amine solvents that can be employed in this invention include isopropylamine, propylamine, diisopropylamine, ethylamine, diethylamine, methylamine, and dimethylamine.

In another aspect, the present invention provides a method of producing petroleum, gas, or other products from a subterranean formation using formation waters. The inventive method comprises the steps of: (a) converting alkalinity in formation water to sulfate; (b) removing sulfate from formation water; and (c) injecting the resulting treated formation water product into the subterranean formation. Alkalinity in formation water is converted to sulfate in step (a) by (i) adding an acid gas in an amount sufficient to react with the alkalinity of formation water; and (ii) adding a sufficient amount of oxygen as an oxidizer to accelerate the reaction of the acid gas with alkalinity to ultimately form sulfate. Sulfate is removed from formation water in step (b) by (i) concentrating sulfate by membrane distillation; (ii) adding an amine solvent to the sulfate-concentrated formation water to form a precipitate comprising the sulfate; (iii) removing at least most of the amine solvent from sulfate-concentrated formation water by a stripping unit; and (iv) removing the precipitate from sulfate-concentrated formation water to produce the treated formation water product. Formation waters that can be used in this invention are oil-gas fields produced waters, methane coal-bed produced waters, aquifers waters, and the like. The acid gas that can be used in this invention is sulfur dioxide or oxidized hydrogen sulfide. The amine solvents that can be employed in this invention include isopropylamine, propylamine, diisopropylamine, ethylamine, diethylamine, methylamine, and dimethylamine.

In another aspect, the present invention provides a method of producing petroleum, gas, or other products from a subterranean formation using formation waters. The inventive method comprises the steps of: (a) converting alkalinity in formation water to sulfate; (b) removing sulfate from formation water; and (c) injecting the resulting treated formation water product into the subterranean formation. Alkalinity in formation water is converted to sulfate in step (a) by (i) adding an acid gas in an amount sufficient to react with the alkalinity of formation water; and (ii) adding a sufficient amount of oxygen as an oxidizer to accelerate the reaction of the acid gas with alkalinity to ultimately form sulfate. Sulfate is removed from formation water in step (b) by (i) concentrating sulfate by nanofiltration to produce sulfate-concentrated formation and nearly sulfate-free formation water; (ii) adding an amine solvent to the sulfate-concentrated formation water to form a precipitate comprising the sulfate; (iii) removing at least most of the amine solvent from sulfate-concentrated formation water by a stripping unit; (iv) removing the precipitate from the sulfate-concentrated formation water to produce sulfate-treated formation water; and (v) mixing the nanofitration nearly sulfate-free formation water from step (i) with the sulfate-treated formation water from step (iv) to produce treated formation water product. Formation waters that can be used in this invention are oil-gas fields produced waters, methane coal-bed produced waters, aquifers waters, and the like. The acid gas that can be used in this invention is sulfur dioxide or oxidized hydrogen sulfide. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of seawater. The inventive method comprises the steps of: (a) if present, oxidizing some acidic gases with very limited aqueous solubility to higher oxides with higher aqueous solubility; (b) absorbing acid gases from gaseous streams; and (c) discharging spent seawater to the sea. Oxidizing acidic gases with very limited aqueous solubility to higher oxides in step (a) by adding a sufficient amount of ozone as a bactericidal and as a strong oxidizer to convert $H_2S$ to $SO_2$, or NO to $NO_2$. Absorbing acid gases from gaseous streams in step (b) by (i) concentrating the alkalinity of seawater by membrane distillation to provide sufficient absorption capacity; (ii) adding acid gases to alkalinity-concentrated seawater in an absorption tower; (iii) adding an amine solvent to the absorbed acid gases in the absorption tower to enhance their oxidation and to rapidly form sulfite and sulfate; (iv) removing at least most of the amine solvent from seawater by a stripping unit; and (v) removing the precipitated sulfite-sulfate slurry from the spent seawater, and partially recycling the slurry to the absorption tower. Acid gases that can be used in this invention include $H_2S$, $SO_2$, $CO_2$, NO, $NO_2$, and the like. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of seawater. The inventive method comprises the steps of: (a) if present, oxidizing some acidic gases with very limited aqueous solubility to higher oxides with higher aqueous solubility; (b) absorbing acid gases from gaseous streams; and (c) discharging spent seawater to the sea. Oxidizing acidic gases with very limited aqueous solubility to higher oxides in step (a) by adding a sufficient amount of ozone as a bactericidal and as a strong oxidizer to convert $H_2S$ to $SO_2$, or NO to $NO_2$. Absorbing acid gases from gaseous streams in step (b) by (i) concentrating the alkalinity of seawater by nanofiltration to provide sufficient absorption capacity; (ii) adding acid gases to alkalinity-concentrated seawater in an absorption tower; (iii) adding an amine solvent to the absorbed acid gases in the absorption tower to enhance their oxidation and to rapidly form sulfite and sulfate; (iv) removing at least most of the amine solvent from seawater by a stripping unit; and (v) removing the precipitated sulfite-sulfate slurry from the spent seawater, and partially recycling the slurry to the absorption tower. Acid gases that can be used in this invention include $H_2S$, $SO_2$, $CO_2$, NO, $NO_2$, and the like. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of seawater. The inventive method comprises the steps of: (a) if present, oxidizing some acidic gases with very limited aqueous solubility to higher oxides with higher aqueous solubility; (b) absorbing acid gases from gaseous streams; and (c) discharging spent seawater to the sea. Oxidizing acidic gases with very limited aqueous solubility to higher oxides in step (a) by adding a sufficient amount of ozone as a bactericidal and as a strong oxidizer to convert $H_2S$ to $SO_2$, or NO to $NO_2$. Absorbing acid gases from gaseous streams in step (b) by (i) adding acid gases to seawater in an absorption tower; (ii) adding an amine solvent to the absorbed acid gases in the absorption tower to enhance their oxidation and to rapidly form sulfite and sulfate; (iv) removing at least most of the amine solvent from seawater by a stripping unit; and (v) removing the precipitated sulfite-sulfate slurry from the spent seawater, and partially recycling the slurry to the absorption tower. Acid gases that can be used in this invention include $H_2S$, $SO_2$, $CO_2$, NO, $NO_2$, and the like. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of formation waters. The inventive method comprises the steps of: (a) if present, oxidizing some acidic gases with very limited aqueous solubility to higher oxides with higher aqueous solubility; (b) absorbing acid gases from gaseous streams; and (c) disposing spent formation water into a disposal well. Oxidizing acidic gases with very limited aqueous solubility to higher oxides in step (a) by adding a sufficient amount of oxygen (air as a source) as an oxidizer to convert $H_2S$ to $SO_2$, or NO to $NO_2$. Absorbing acid gases from gaseous streams in step (b) by (i) concentrating the alkalinity of formation water by membrane distillation to provide sufficient absorption capacity; (ii) adding acid gases to alkalinity-concentrated formation water in an absorption tower; (iii) adding an amine solvent to the absorbed acid gases in the absorption tower to enhance their oxidation and to rapidly form sulfite and sulfate; (iv) removing at least most of the amine solvent from formation water by a stripping unit; and (v) removing the precipitated sulfite-sulfate slurry from the spent formation water, and partially recycling the slurry to the absorption tower. Acid gases that can be used in this invention include $H_2S$, $SO_2$, $CO_2$, NO, $NO_2$, and the like. Formation waters that can be used in this invention are oil-gas fields produced waters, methane coal-bed produced waters, aquifers waters, and the like. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of formation waters. The inventive method comprises the steps of: (a) if present, oxidizing some acidic gases with very limited aqueous solubility to higher oxides with higher aqueous solubility; (b) absorbing acid gases from gaseous streams; and (c) disposing spent formation water into a disposal well. Oxidizing acidic gases with very limited aqueous solubility to higher oxides in step (a) by adding a sufficient amount of oxygen (air as a source) as an oxidizer to convert $H_2S$ to $SO_2$, or NO to $NO_2$. Absorbing acid gases from gaseous streams in step (b) by (i) concentrating the alkalinity of formation water by nanofiltration to provide sufficient absorption capacity; (ii) adding acid gases to alkalinity-concentrated formation water in an absorption tower; (iii) adding an amine solvent to the absorbed acid gases in the absorption tower to enhance their oxidation and to rapidly form sulfite and sulfate; (iv) removing at least most of the amine solvent from formation water by a stripping unit; and (v) removing the precipitated sulfite-sulfate slurry from the spent formation water, and partially recycling the slurry to the absorption tower. Acid gases that can be used in this invention include $H_2S$, $SO_2$, $CO_2$, NO, $NO_2$, and the like. Formation waters that can be used in this invention are oil-gas fields produced waters, methane coal-bed produced waters, aquifers waters, and the like. The amine solvents that can be employed in this invention method include isopropylamine, propylamine, diisopropylamine, ethylamine, diethylamine, methylamine, and dimethylamine.

In another aspect, the present invention provides a method for the treatment of acid gases using the alkalinity of formation waters. The inventive method comprises the steps of: (a) if present, oxidizing some acidic gases with very limited aqueous solubility to higher oxides with higher aqueous solubility; (b) absorbing acid gases from gaseous streams; and (c) disposing spent formation water into a disposal well. Oxidizing acidic gases with very limited aqueous solubility to higher oxides in step (a) by adding a sufficient amount of oxygen (air as a source) as an oxidizer to convert $H_2S$ to $SO_2$, or NO to $NO_2$. Absorbing acid gases from gaseous streams in step (b) by (i) adding acid gases to formation water in an absorption tower; (ii) adding an amine solvent to the absorbed acid gases in the absorption tower to enhance their oxidation and to rapidly form sulfite and sulfate; (iii) removing at least most of the amine solvent from formation water by a stripping unit; and (iv) removing the precipitated sulfite-sulfate slurry from the spent formation water, and partially recycling the slurry to the absorption tower. Acid gases that can be used in this invention include $H_2S$, $SO_2$, $CO_2$, NO, $NO_2$, and the like. Formation waters that can be used in this invention are oil-gas fields produced waters, methane coal-bed produced waters, aquifers waters, and the like. The amine solvents that can be employed in this invention method include isopropylamine, propylamine, diisopropylamine, ethylamine, diethylamine, methylamine, and dimethylamine.

In yet another aspect, the present invention provides a method for the treatment of acid and radioactive gases using an amine solvent as a direct absorption media. The inventive method comprises the steps of: (a) absorbing acid and/or radioactive gases by an amine solvent; and (b) stripping and recovering the amine solvent. Absorbing acid and/or radioactive gases in step (a) by (i) adding an amine solvent to absorb acid and/or radioactive gases in an absorption tower; and (ii) venting the treated gas stream from the top of the top of the absorption tower. Stripping and recovering the amine solvent in step (b) by (i) injecting an optimum amount water into a re-generating tower; (ii) heating, if needed, the gas-amine-water mixture to release the gas from the amine-water mixture; (iii) removing at least most of the amine solvent from water by a stripping unit and recycling the stripped amine solvent to the absorption tower; and (iv) removing precipitate from water and recycling the filtered water to the re-generating tower. Acid gases that can be used in this invention include $H_2S$, $SO_2$, $CO_2$, NO, $NO_2$, and the like. Radioactive gases that can be used in this invention include radon, its radioactive daughter products, and the like. The amine solvents that can be employed in this invention include isopropylamine, propylamine, diisopropylamine, ethylamine, diethylamine, methylamine, and dimethylamine.

This invention is of particular interest in connection with oil and gas industries, mining industries, geothermal power plants, coal or oil fired power plants and industrial boilers, saline water desalination plants, fertilizing industries, and the like. However, this invention is not restricted to use in connection with one particular industry. Further objects, features, and advantages of the present invention will be apparent to those skilled in the art upon examining the accompanying drawings and upon reading the following description of the preferred embodiments.

DESCRIPTION OF THE PREFERRED EMBODIMENT

Figure 1:
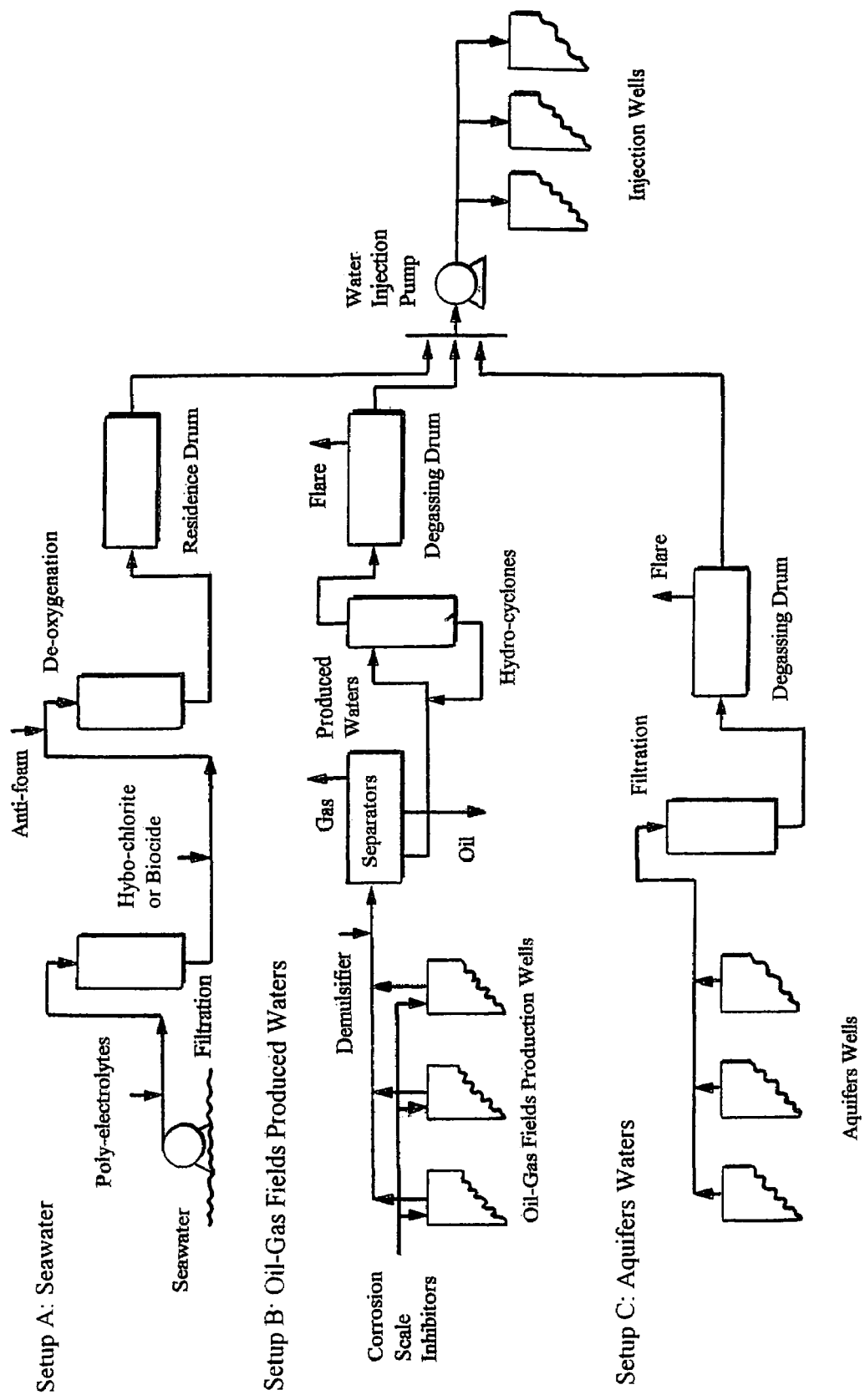
FIG. 1 illustrates possible schemes for water injection operations using seawater, produced waters, and aquifers water as a single source or as a combination of sources.
Figure 2:
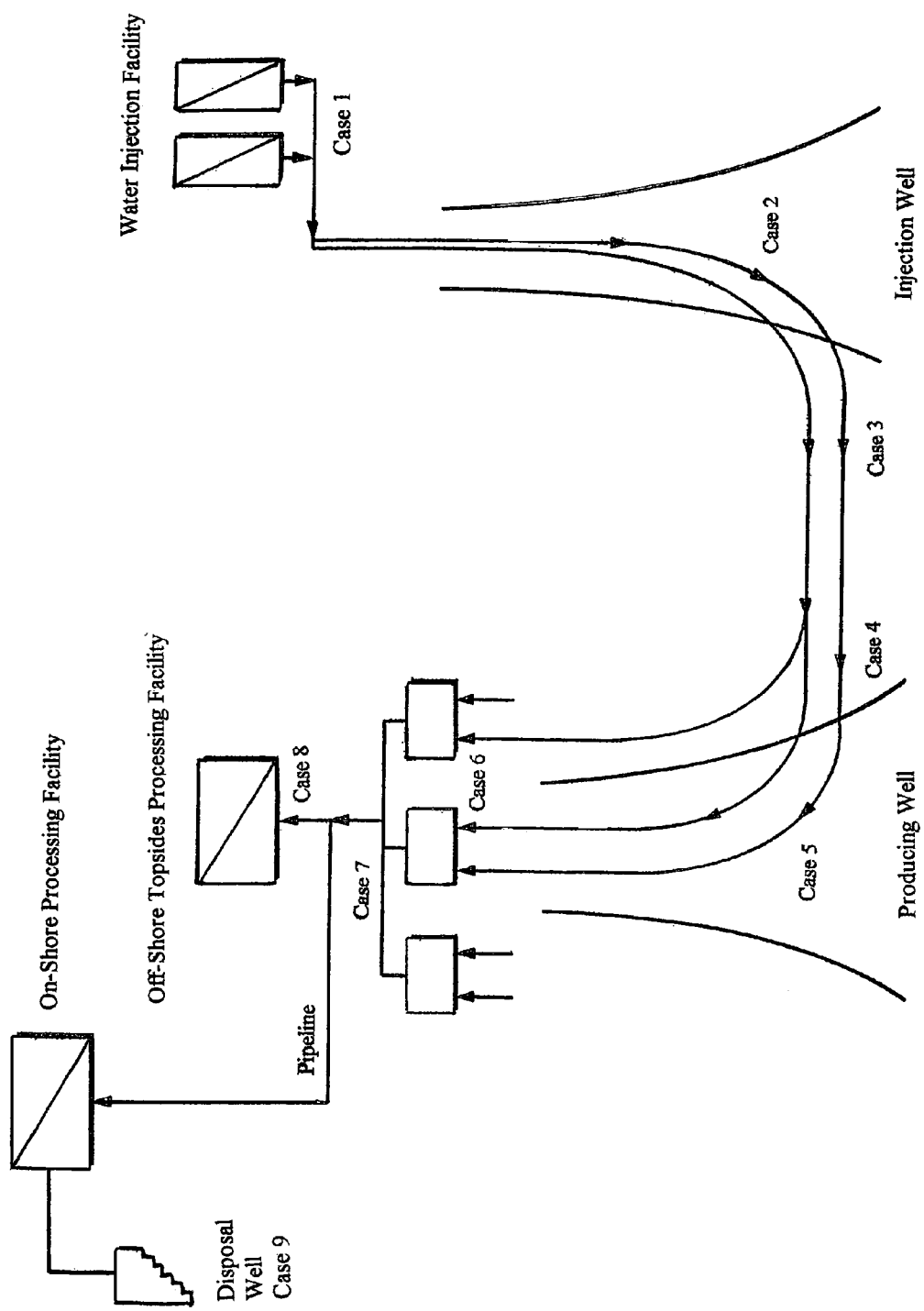
FIG. 2 illustrates the possible locations of scale deposits throughout the paths of water injection.

I have previously invented a liquid-phase precipitation (LPP) process for the removal of polyvalent cations and anions from aqueous streams. The effect of the separation in the LPP process is to intermix an aqueous solution with a suitable solvent at ambient temperature and atmospheric pressure to form selective precipitates. The suitable solvents are those which have the capability to meet two basic criteria: (1) suitability to precipitate targeted inorganic species from aqueous solutions; and (2) suitability for overall process design. The selected organic solvent must be miscible with the aqueous phase. Of equal importance, the targeted inorganic salts must be sparingly soluble (preferably nearly insoluble) in the organic solvent.

For ease of recovery and reuse, the selected organic solvent must have favorable physical properties such as low boiling point, and no azeotrope formation with water. From a process design standpoint, the selected solvent must have low toxicity since traces of the organic solvent always remain in the discharge stream. In addition, the selected solvent must be chemically stable, compatible with the process, and relatively inexpensive. Several solvents have been identified for potential use in the LPP process. These solvents are isopropylamine (IPA), propylamine (PA), diisopropylamine (DIPA), ethylamine (EA), diethylamine (DEA), methylamine (MA), and dimethylamine (DMA).

The effectiveness of the LPP process is based on of the fact that a solid phase will form or re-form if a targeted dissolved inorganic solute in a solvent environment is elevated from sub-saturation to higher concentrations (e.g., near-saturation, saturation, super-saturation). The addition of an amine solvent to an inorganics-aqueous solution leads to capture of part of the water molecules and reduces the aqueous solubility of the inorganic solute to form insoluble precipitates. The ionic charge, the ionic radius, the presence of sufficient and suitable anionic and cationic species, and the solubility limits of the targeted cationic-anionic compound in both water and amine solvents play an important role in the degree of forming precipitates. As such, the amount of the added amine solvent for effective precipitation determines the economical value of the LPP process.

In applications where a targeted dissolved inorganic species in a solvent environment is substantially under saturated, the effectiveness of the LPP as a stand alone process might be limited. For instance, the selective removal of sparingly soluble alkaline cations in the forms of sulfate, carbonate, and silicate from seawater, oil-field produced waters, formation water and the like can be enhanced if the LPP process is modified with a pre-concentration step to elevate the concentration of a targeted inorganic species, and/or with different mechanisms in adding the amine solvent (e.g., a compressed-phase rather than a liquid-phase amine injection).

This invention provides an innovative modified liquid-phase precipitation (MLPP) process as well as a compressed-phase precipitation (CPP) process that can be used to solve the inherent limitation of the LPP process as a stand alone. That is substantially enhancing the formation of a solid phase even when the targeted dissolved inorganic solute in a solvent environment is under saturated.

The MLPP process can be accomplished by changing the chemistry of a given inorganic species, or by physically pre-concentrating a given inorganic species, or by both. The CPP can be implemented by using a compressed amine solvent at higher pressures and temperatures, and/or by matching the compressed amine solvent with an appropriate modifier to enhance its precipitation ability, while maintaining its polarity, basicity, and miscibility.

The same concept (inorganic species in mixed-solvent mixture) that underlines the LPP or MLPP or CPP processes can be extended for the separation of gases by absorption (gaseous species in mixed-solvent mixture). A targeted gas species must be sparingly or nearly insoluble in water but with partial homogeneity in the amine solvent, whereas the mother solvent (amine) in which the gas species is absorbed, is miscible with water.

Two significant advantages can be achieved with the use of the MLPP or CPP process. First, they can be used for dual and possibly simultaneous control of targeted inorganic and gaseous species. For instance, the alkalinity in saline waters can be converted to sulfite and sulfate by absorbing an acid gas such as sulfur dioxide. In this case, the alkalinity scale and the polluting acidic gas are controlled simultaneously in a single process.

Second, a compressed-phase amine solvent in the CPP process is characterized by diffusivity that can be orders of magnitude higher, and viscosity that can be orders of magnitude lower, than in its liquid-phase. The fast diffusion combined with lower viscosity of the compressed amine solvent into an inorganic-aqueous solution produces the super-saturation of the targeted sparingly soluble inorganic species, and thus its ease of precipitation with a minimal amount of amine. The exact analogy is also applicable to the absorption of gaseous species by amine solvents.

Molecules containing a hydrogen atom bonded to nitrogen, or oxygen, or fluorine form a strong dipole-dipole interaction and hydrogen bonding. Primary amines, including for instance, IPA, EA and MA, undergo hydrogen bonding. Such amines are thus polar solvents and completely miscible in water. However, they are less polar than alcohols. This stems from the fact that the N—HN hydrogen bond between amine molecules is weaker than the O—HO hydrogen bond because nitrogen is less electronegative than oxygen. As a result, primary amines have low boiling points.

Weak bases such as primary amines do not furnish the hydroxide ion directly by dissociation. Rather, the hydroxide ions are generated by the aqueous reaction. The reactions of IPA, EA, and MA with water are, respectively, given as follows:

  (1)

  (2)

  (3)

Such amines behave like ammonia ($NH_3$). In fact, the IPA or EA or MA molecule is very similar to ammonia, except that a $C_3H_7$ (IPA), or $C_2H_5$ (EA), or $CH_3$ (MA) group is replaced with a hydrogen atom. However, primary amines pose far less serious technical and instrumental problems than $NH_3$ (e.g., less corrosiveness, lower vapor pressures, etc.).

The aqueous solubilities of primary amines decrease with increasing temperature. At lower temperatures, molecules of primary amines can form stronger hydrogen bonds with water molecules than they can with themselves. The hydrogen bonds can be broken primarily by thermal energy at higher temperatures, or by a significant presence of inorganic species in water, or by both. As such, primary amines can substantially be recovered from aqueous streams, particularly saline streams.

Scale components in natural saline waters (e.g., seawater and formation waters) are mainly alkaline scales (calcium carbonate or calcite, and magnesium hydroxide or brucite), and sparingly soluble alkaline cations (calcium, strontium, barium, and radium) in the forms of sulfate. Calcium sulfate, however, has three temperature-dependent hydrates: (1) gypsum or dihydrate ($CaSO_4 \cdot 2H_2O$) that precipitates at low temperatures (below 55° C.); and (2) hemihydrate ($CaSO_4 \cdot 0.5H_2O$) or anhydrite ($CaSO_4$) that precipitate at high temperatures (above 95° C.). Small amounts of silica and metal oxides are also found in natural waters.

Figure 3:
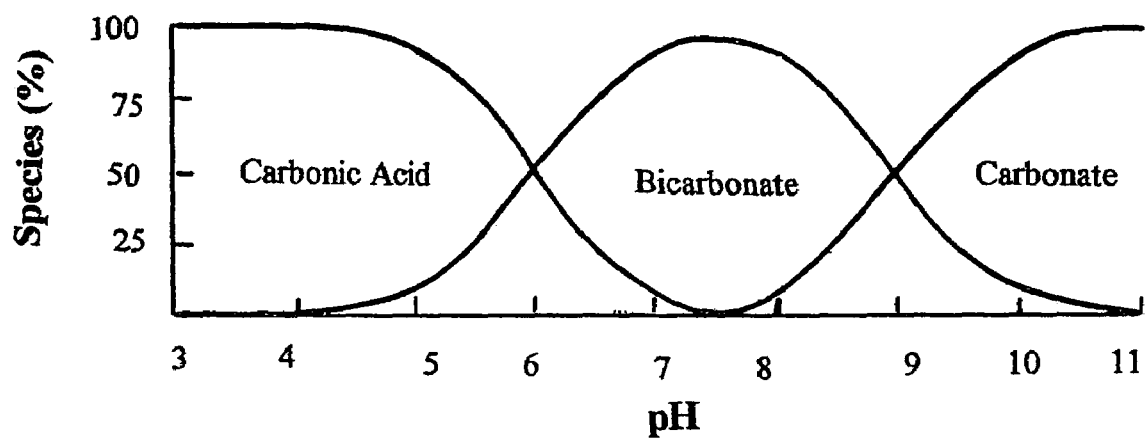
FIG. 3 illustrates the distribution of carbonate species in water.

The precipitation of alkaline scale is pH-dependent. FIG. 3 illustrates the distribution of carbonate species (carbonic acid, bicarbonate and carbonate ions) in natural waters. The carbonic acid is an unionized divalent acid with $pK_1=6.35$ and $pK_2=10.33$. At pH=6.35, the carbonic acid and the bicarbonate ion exist in equal concentrations. At pH=7.35, the natural saline water contains 10% of carbonic acid and 90% of bicarbonate ion. At pH=8.35, the bicarbonate ion approaches 99% and the remaining 1% is carbonic acid. Between pH values of 8.2 and 8.4, the carbonate ion starts to appear. At pH=9.3, about 10% of the bicarbonate ion is converted to carbonate ion, and at pH=10.33, bicarbonate and carbonate ions exist in almost equal concentrations. The pH values of natural saline waters are in the range of 6 to 8. As such, the alkalinity of natural waters at normal temperatures is almost entirely in the form of bicarbonate ion. The bicarbonate ion would give rise to carbonate ion in the form of calcium, and/or hydroxide ion in the form of magnesium upon the depletion of carbon dioxide or heating.

The alkaline scale formation can possibly be explained by two mechanisms. The first mechanism is summarized by the following relations:

  (4)

  (5)

  (6)

While the second mechanism is given as follows:

  (7)

  (8)

  (9)

Although the formation of alkaline scales is a complex interaction, it appears that the first mechanism is more probable at the bicarbonate concentration in natural water, while the second mechanism is more probable in the presence of excess concentrations of bicarbonate ion. However, both mechanisms may involve in the actual alkaline scale formation under certain operating conditions.

On the other hand, the precipitation of sparingly soluble cations in the forms of sulfate is the result of a physical process that occurs only when the aqueous solubility limits of such cations are exceeded. However, strontium and barium are present in natural saline waters in much smaller concentrations than calcium. This is attributed to their very low aqueous solubility limits (e.g., the aqueous solubility limit of barium sulfate is about 2 mg/L). In contrast, the solubility limit of gypsum is about 2,300 mg/L in potable water, and increases with increasing water salinity (e.g., 3,500 mg/L in seawater).

In treating natural saline waters (seawater, produced waters, aquifers waters, and the like) for oil-gas fields water injection operations, there is an interest to simultaneously target the removal of alkaline scale and sulfate scale from such waters. A possible approach to accomplish this is to convert alkaline scale to sulfate. This approach would: (1) eliminate the continuous injection of concentrated acids along with anti-scale additives to inhibit alkaline scale from forming; and (2) pre-concentrate sulfate in the targeted natural saline water, and thus would ease sulfate precipitation (mainly in forms of calcium as well as strontium and/or barium) with the addition of a minimal amount of amine.

Nitrogen can form compounds with only three covalent bonds to other atoms. A molecule of amine contains $sp^3$-hybridized nitrogen atom bonded to one or more carbon atoms. The nitrogen has one orbital filled with a pair of unshared valence electrons, which allows these compounds to act as bases. As such, primary amines are weak bases that could undergo reversible reactions with water or other weak acids (e.g., $H_2S$ and $CO_2$). When an amine is reacted with a stronger acid (e.g., $SO_2$), however, the unshared electrons of the amine are used to form sigma bond with the acid, which drives the reaction to completion (irreversibly).

Figure 4:
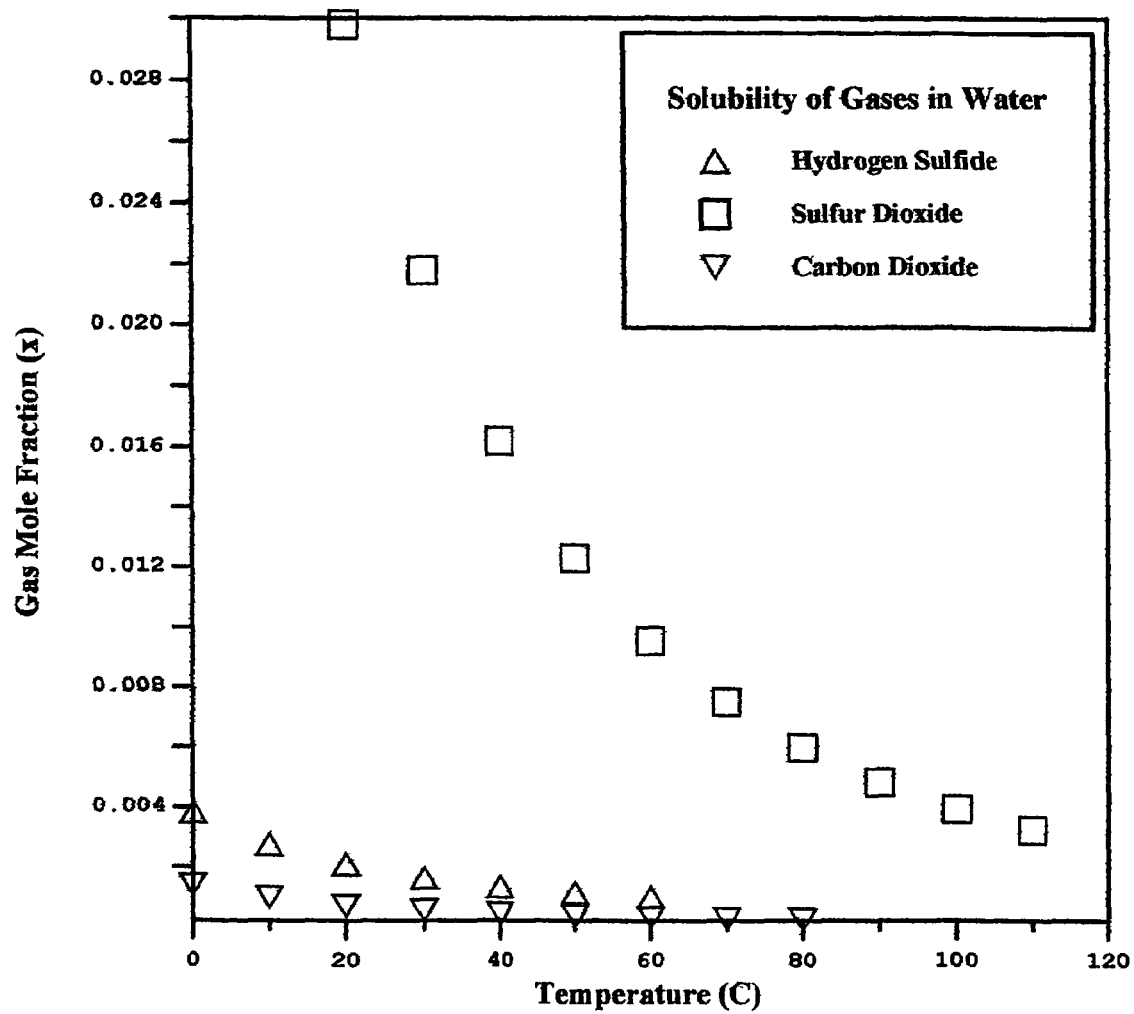
FIG. 4 illustrates the solubilities of some acid gases in water.

As shown in FIG. 4, the aqueous solubility of $SO_2$ is higher than the aqueous solubility of $CO_2$. In addition, the hydrolysis reaction of $SO_2$ in aqueous solutions is much faster than the analogous reaction of $CO_2$. Furthermore, $SO_2$ does not react with amines to form the equivalent of a carbamate. As such, the chemistry of $SO_2$ in aqueous solutions is essentially of acid-base nature. More importantly, $SO_2$ can be oxidized to $SO_3$, and thus its irreversible transformation to sulfate ($SO_4$) could be advantageous.

$SO_2$ from inexpensive or polluting sources (e.g., sour gas streams, or tail gas streams, or flue gas streams, etc.) can be absorbed in saline waters to convert alkalinity to sulfite. Sulfite can then be oxidized to form sulfate. These reactions are given as follows:

$$SO_2 + H_2O \Leftrightarrow H_2SO_3 \quad (10)$$

$$H_2SO_3 \Leftrightarrow HSO_3 + H \quad (11)$$

$$HSO_3 \Leftrightarrow SO_3 + H \quad (12)$$

$$SO_3 + \frac{1}{2}O_2 \rightarrow SO_4 \quad (13)$$

The alkalinity in natural saline waters (as high as 800 mg/L in formation waters, and about 143 mg/L in seawater) is well suited for the absorption of $SO_2$. The overall reaction between natural saline water and $SO_2$ may be given as follows:

$$CaCO_3 + SO_2 + 2H_2O + \frac{1}{2}O_2 \rightarrow CaSO_4 2H_2O + CO_2 \quad (14)$$

Several issues about the oxidation of sulfite to sulfate must be highlighted. First, the rate of the sulfite reaction is slow since the sulfite ion depletes oxygen from saline water (e.g., seawater contains about 7 mg/L of oxygen). Calcium sulfite or calcium sulfate can be equally precipitated by the precipitation process, and therefore, there is no critical need to convert calcium sulfite to calcium sulfate. This could be advantageous in oil-gas fields water injection operations where the treated natural saline water ought to be de-oxygenated. As such, the formation of sulfite ion could serve as an oxygen scavenger.

Second, the oxidation rate of the sulfite ion can be considerably faster in the presence of a high pH media. As such, the use of primary amines as precipitation solvents would be advantageous in rapidly oxidizing sulfite to sulfate. The crystallizer in the precipitation process, for instance, can be used as a sulfite-oxidation, sulfate-precipitation unit. In addition, this issue is very critical in using the alkalinity of a natural saline water, for instance, as a sink for the absorption and removal of $SO_2$ and other polluting gases from flue gas streams (the reversed process). In this case, the precipitated sulfite in the form calcium can not be discharged directly to surface water such as seawater since it scavenges oxygen, and thus it imposes adverse affects on the living species of the marine environment.

Third, the oxidation rate of the sulfite ion can also be considerably faster in the presence of a powerful oxidizing agent such as ozone. Ozone can be used to kill bacteria, an essential step in seawater treatment. Ozone could thus serve as an oxidizer to convert sulfite to sulfate, and as an instantaneous disinfectant to prevent bacterial growth.

$H_2S$ is a sulfur contaminant with an acidity weaker than $SO_2$. For health, safety, corrosion, catalyst poisoning, and pollution prevention reasons, $H_2S$ must be treated. Conversion of $H_2S$ to elemental sulfur is one of the treatment methods. In the application of the precipitation process to treat saline waters for oil-gas fields water injection operations, $H_2S$ from, for instance, nearby sour gas production facilities, can be employed as a source for $SO_2$. The oxidation of $H_2S$ leads to the formation of $SO_2$ as follows:

$$H_2S + \frac{3}{2}O_2 \Leftrightarrow SO_2 + H_2O \quad (15)$$

This would serve both the treatment of alkaline and sulfate scales as well as the treatment of sour gas streams. The possible removal of $H_2S$ (and/or $SO_2$) from the polluting sources, combined with the removal of alkaline and sulfate scales from natural saline waters are one of the innovative approaches of this invention.

$CO_2$ is an anhydride that needs to be hydrated to become an acid (similar to $SO_2$). The acidity of $CO_2$ is comparable to $H_2S$, but is weaker than the acidity of $SO_2$. As shown in FIG. 4, the aqueous solubility $CO_2$ is also lower than the aqueous solubility of $SO_2$. The reaction of $CO_2$ with water leads to significantly reduce the pH of the solution, and thus the release of carbonic acid ($H_2CO_3$). These reactions are given as follows:

$$CO_2 + H_2O \leftrightarrow H_2CO_3 \quad (16)$$

$$H_2CO_3 \leftrightarrow HCO_3 + H \quad (17)$$

$$HCO_3 \leftrightarrow CO_3 + H \quad (18)$$

Such reaction steps are similar to the reaction steps of $SO_2$ in water. However, $H_2CO_3$ is a much weaker acid than $H_2SO_3$. Primary amines react with $CO_2$ as a weak acid to form carbamate, or a split phase with variable solubility. The low aqueous solubility, acidity, and non-polarity of $CO_2$ combined with it is incomplete homogeneity in primary amines could be advantageous in using primary amines as direct scrubbing solvents for $CO_2$.

Nitrogen monoxide (NO) and nitrogen dioxide ($NO_2$) are the major oxides of nitrogen. NO is nearly insoluble in water or basic solutions. As such, in order to hydrolyze NO, it must be first converted to $NO_2$. The oxidation of NO to $NO_2$ can be accomplished by the addition of oxygen as follows:

$$2NO + O_2 \leftrightarrow 2NO_2 \quad (19)$$

$$2NO_2 + H_2O \rightarrow NO + 2HNO_3 \quad (20)$$

The reaction given in Equation (19) is reversible, and the hydrolysis of $NO_2$ as given in Equation (20) leads to partial release of NO. However, the use of a more powerful oxidizing agent such as ozone would convert irreversibly a significant portion of NO to $NO_2$ as follows.

$$NO + O_3 \rightarrow NO_2 + O_2 \quad (21)$$

NO and $NO_2$ molecules both contain an odd number of valence electrons (11 in NO and 17 in $NO_2$). Therefore, each molecule contains a single unpaired electron. Such molecules can combine with one another to form dimers. For instance, a mixture of NO and $NO_2$ could react to form dinitrogen trioxide ($N_2O_3$) as follows:

$$NO + NO_2 \leftrightarrow N_2O_3 \quad (22)$$

The $N_2O_3$ hydrolyzes quickly in basic solutions to form nitrous acid and nitrite ion:

$$N_2O_3 + H_2O \rightarrow 2HNO_2 \quad (23)$$

$$HNO_2 + OH \rightarrow NO_2 + H_2O \quad (24)$$

or to form nitric acid and nitrate ion:

$$2NO_2 + H_2O \rightarrow HNO_2 + HNO_3 \quad (25)$$

$$HNO_3 + OH \rightarrow H_2O + NO_3 \quad (26)$$

Equations (22) to (26) provide another approach where nitrogen oxides can be absorbed by alkalinity and/or primary amines as a scrubbing media to form nitrite and nitrate ions. Nitrite and nitrate ions are far more soluble in water than sulfite, sulfate, bicarbonate and carbonate ions.

EXAMPLE 1

Seawater

Depending on the source of seawater (e.g., Gulf of Mexico, North Sea, Arabian Gulf, etc.), the sulfate concentration varies between 2,700 to 3,600 ppm. Although there is a considerable difference in sulfate concentration of seawater from different sources, the relative abundance of the major constituents of seawater (e.g., sulfate to chloride ratio) is about the same everywhere. The variation in the sulfate concentration may be insignificant in choosing the method for treating seawater (e.g., the aqueous solubility limit of calcium sulfate is a function of salinity and temperature). However, higher sulfate concentrations in seawater (e.g., Arabian Gulf) leads to magnify the amount sulfate scale deposits in the forms sparingly soluble alkaline cations in the reservoirs if seawater is injected without selective removal of sulfate.

Figure 5:
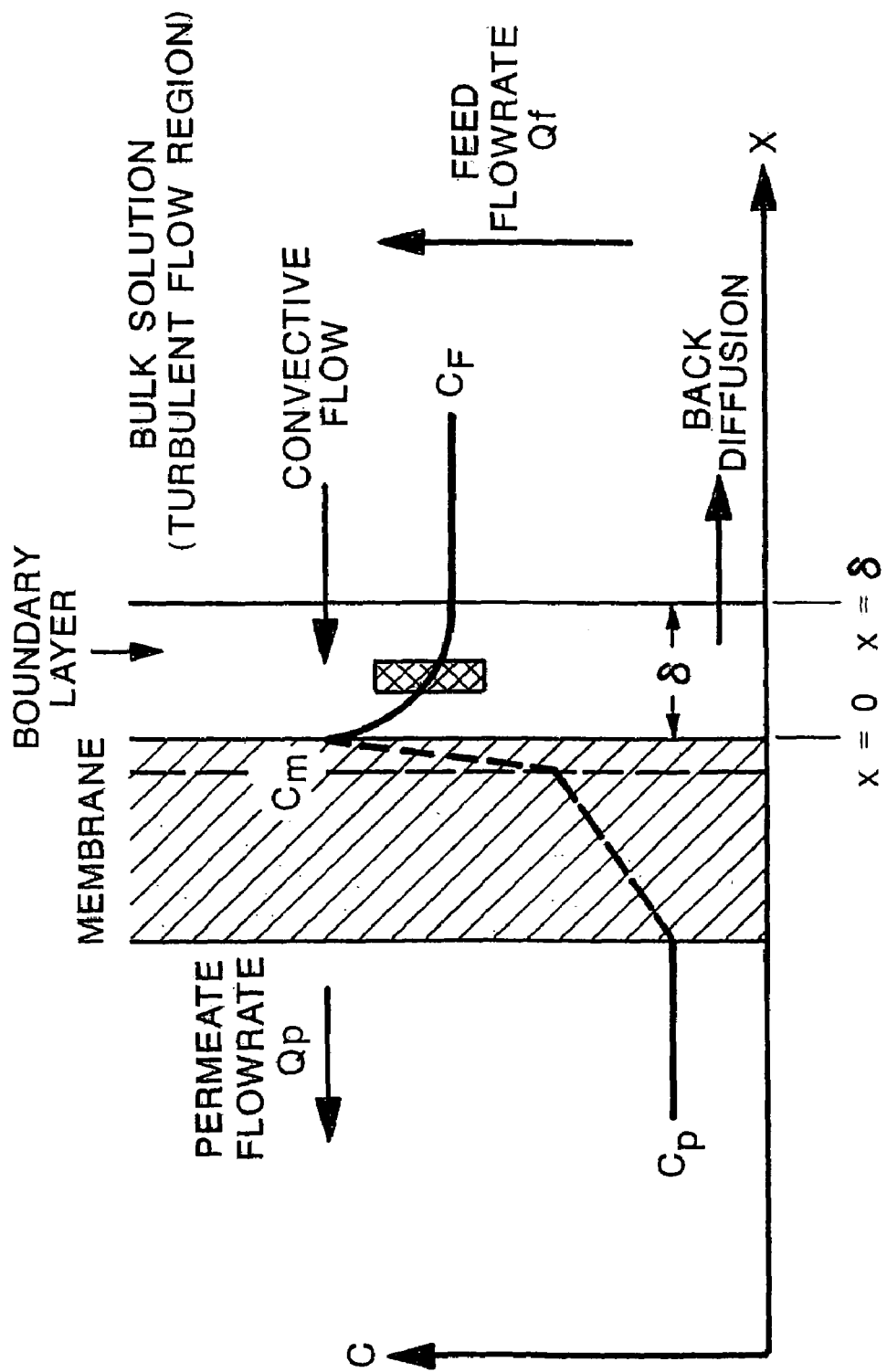
FIG. 5 illustrates the concentration polarization profile in nanofiltration.

Nanofiltration (NF) membranes are capable of highly rejecting divalent ions (e.g., sulfate ion) while retaining a large portion of monovalent ions (e.g., chloride ion) from seawater. As is the case with any pressure-driven membrane processes, the concentration polarization phenomenon is one of the most critical problems encountered in the operation of NF systems. FIG. 5 depicts the concentration polarization profile.

Solutes are carried to the membrane by the bulk motion of the fluid (convective flow). As water permeates through the membrane, the rejected solutes are left behind to accumulate at the membrane surface. The rejected solutes diffuse away from the membrane surface due to the resulting concentration gradient (back diffusion). Such convective and back diffusion mechanisms can not be totally balanced (attributed to the number, fraction and chemical identities of rejected solutes as well as the membrane material). However, the imbalance of such mechanisms can be controlled to some extent by promoting turbulent mixing, and by minimizing the water depth on the feed side of the membrane (improving the distribution of the feed flow over the membrane surface, and the geometry of the membrane module). Water flow increases with increasing pressure, and thus concentration polarization becomes more pronounced as pressure increases.

I have analyzed the reported bench-scale NF data to selectively remove sulfate from the North Sea (Bilstad, T., "Sulfate Separation from Seawater by Nanofiltration", In Produced Water, Edited by Ray, J. P. (1992): 503–509). Table 2 presents, at different throughput ratios ($Q_P/Q_F$), the observed experimental rejection ($R_O$) by the NF membrane, feed stream concentrations ($C_F$), permeate stream concentration ($C_P$), concentrate stream concentrations ($C_C$), applied pressure ($\Delta P$), along with the predicted actual experimental rejection in the absence of concentration polarization ($R_a$), the predicted concentrations of ions at the membrane surface ($C_m$), and the corrected osmotic pressure differences between the feed stream at the membrane surface (rather than the bulk) and product stream ($R_a \Delta \Pi_m$) based on the concentrations of sodium chloride. My modified film-theory model was used to predict the values of $R_a$, $C_m$, and $R_a \Delta \pi_m$.

Figure 6:
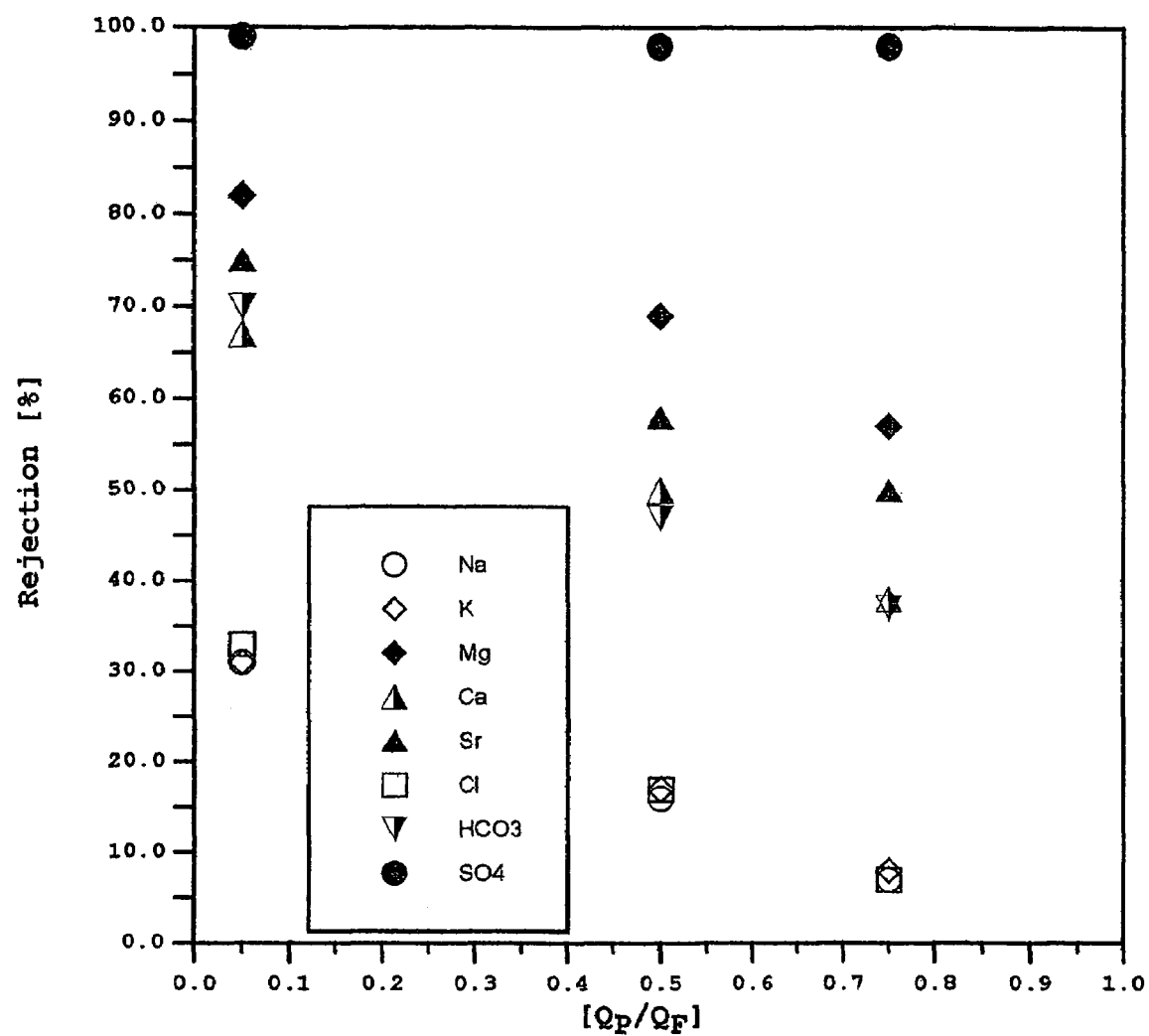
FIG. 6 illustrates the rejection trend of ions from seawater by nanofiltration.

The accumulation of ions at the membrane surface leads to serious operational problems. First, the concentration gradient of a given ion across the membrane increases, and thus allows more ion to pass through the membrane into the permeate stream. Thus, the rejection of such a given ion decreases as throughput ratio increases. Table 2 and FIG. 6 indicate that was indeed the case with the analyzed NF data.

Second, the osmotic pressure increases on the feed side at the membrane surface, and thus reduces the permeate flow. This requires higher operating pressures to achieve and maintain the targeted throughput ratio. Table 2 reveals that was also the case with the tested NF data. For instance, to increase the throughput ratio from 50% to 75%, the applied pressure was increased from 363 psi to 435 psi, and the feed flow rate was lowered from 115 L/hr at 50% throughput ratio to 76 L/hr at 75% throughput ratio, while the permeate flow rate was fixed at 57 L/hr at both 50% and 75% throughput ratios. Thus, concentration polarization clearly became more significant as pressure increased.

Third, if the NF system is operated at 75% throughput ratio of the seawater feed stream, the remaining 25% represents the concentrate stream. For a highly rejected ion such as sulfate (98%), the concentrate stream contains about four-times the initial sulfate concentration in the feed stream. Therefore, the 2,460 ppm of the sulfate ion in the feed stream was translated to 9,660 ppm in the concentrate stream ($C_C$). However, the concentration of sulfate at the membrane surface (17,465 ppm) is about double the concentration of sulfate in the concentrate stream. At the 75% throughput ratio, 38% of the calcium ion is rejected. About 12% of the rejected calcium ion is in the form of bicarbonate. As shown in Table 2 and FIG. 6, the rejection values of the calcium ion and bicarbonate ion were almost identical.

The extent to which a throughput ratio can be optimally operated between nearly sulfate-free permeate stream (as related to ions buildup at the membrane surface) and sulfate-concentrated concentrate stream is limited by the accumulation of the sparingly soluble alkaline cations. As such, the potential precipitation of calcium and strontium ions in the forms of sulfate at the membrane surface as well as in the concentrate stream renders NF as an expensive process to operate and maintain in an effective way.

Three possible processing methods can be implemented to remove selectively and effectively sulfate from seawater to be suitable for oil-gas fields water injection operations. These methods are: (1) the modified liquid-phase precipitation process (MLPP) as a stand alone treatment method; (2) the integration of membrane distillation with modified liquid-phase precipitation (MD-MLPP) in a hybrid treatment method; and (3) the integration of nanofiltration with the modified liquid-phase precipitation (NF-MLPP) in a hybrid treatment method.

Modified Liquid-Phase Precipitation (MLPP) Method

Figure 7:
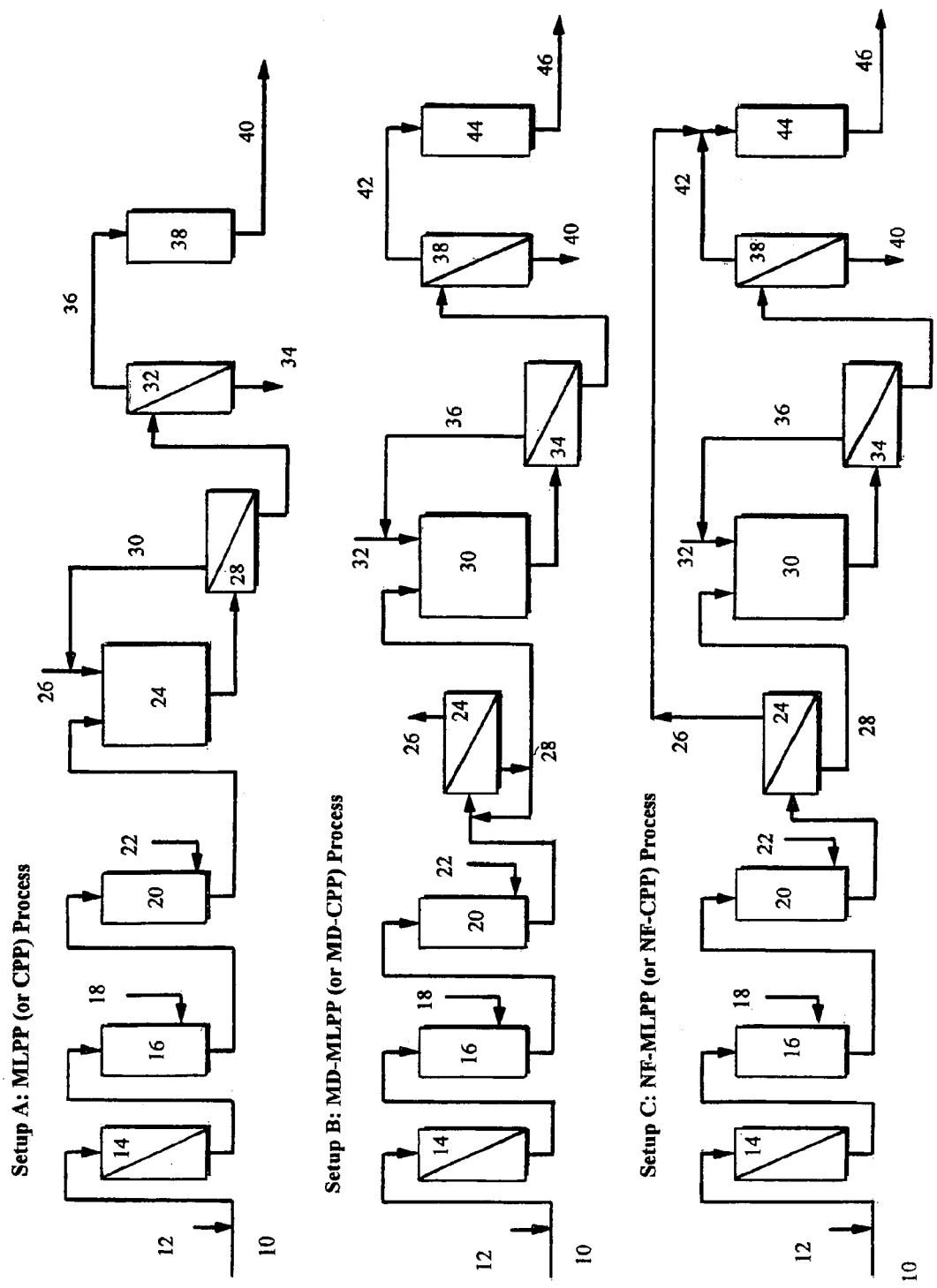
FIG. 7 illustrates processing schemes for the removal alkaline and sulfate scales from saline waters.

FIG. 7 (Setup A) illustrates the MLPP method in a single-stage to treat directly seawater. Seawater [10] will be intermixed with poly-electrolytes [12] to coagulate suspended matters to be filtered with multi-media filters [14]. The pre-filtered seawater will then enter an absorption tower [16] where it will be reacted with a sufficient amount of $SO_2$ [18]. The addition of $SO_2$ will eliminate calcite scale by converting bicarbonate to sulfate in the form of calcium. A waste flue gas, or an oxidized hydrogen sulfide or any inexpensive source can be used to supply $SO_2$. At this stage, the low-pH seawater (due to the addition of $SO_2$) favors direct and slower oxidation reaction of $SO_2$ to higher oxide, $SO_3$.

The acidic seawater will be fed into an oxidation tower [20] to react with a sufficient amount of ozone [22]. Ozone would serve the double objectives as a powerful oxidizer (stronger than oxygen) for faster conversion of $SO_2$ to ultimately sulfate, as well as an effective bactericidal to destroy the bacteria content present in seawater.

The reacted seawater will be fed to a crystallizer [24] where a sufficient amount of amine [26] will be added to cause sulfate precipitation. The crystallizer outlet stream will enter a stripper [28] to recover the amine solvent. The stripper could be a vacuum membrane distillation unit, or a simple flashing drum, or a simple vacuum or standard distillation tower, or a pervaporation unit. The recovered amine solvent [30] will be recycled back to the crystallizer [24].

The formed precipitates (mainly sulfite and sulfate in the forms of alkaline cations) will be separated from the treated seawater by stages of hydrocyclones [32]. The volume of the hydrocyclones under flow (concentrate) stream [34] can be limited to between 5% and 10% of the hydrocyclones feed stream. The over flow of the hydrocyclones [36], which is near sulfate-free seawater, will be fed to a deoxygenation tower [38] to remove oxygen from the treated seawater. The nearly sulfate-free seawater [40] will be ready for use in oil-gas fields water injection operations.

It should be noted that two other processing options for the precipitation step can also be used to efficiently minimize the use of the amine solvent: (1) the hydrocyclones under flow stream [34] can be partially recycled to the crystallize feed stream to enhance the concentration of gypsum; and/or (2) if needed, two-stage (or a multiple-stage) crystallizers can be employed instead of a single-stage crystallizer.

It should also be noted that the oxidation step can be implemented by diffusing ozone via the conduit that connects the absorption tower [16] to the crystallizer [24], or by using the crystallizer to conduct simultaneously the oxidation and precipitation steps, and thus eliminate the use of the oxidation tower [20] as a stand alone unit. The high-pH conditions in the crystallizer [24] (due to the release of hydroxide ion from an amine weak base) favor fast oxidation reaction.

It should also be noted that when disinfection is not required (e.g., produced waters and aquifers waters), oxygen (air as a source) instead of ozone can be used as an oxidizer [22] taking advantage the high-pH conditions in the crystallizer.

It should also be noted that the discussed processing systems can be used as alkaline and sulfate scales pretreatment for saline water desalination plants such as multi-flash distillation or reverse osmosis systems.

Membrane Distillation-Modified Liquid-Phase Precipitation (MD-MLPP) Method

FIG. 7 (Setup B) illustrates a single-stage MD-MLPP to treat seawater. Seawater [10] will be intermixed with poly-electrolytes [12] to coagulate suspended matters to be filtered with multi-media filters [14]. The pre-filtered seawater will be introduced into an absorption tower [16] where it will be reacted with a sufficient amount of $SO_2$ [18]. The low-pH seawater will then be oxidized in an oxidation tower [20] with a sufficient amount of ozone [22].

In processing setups (FIG. 7; Setups B and C) where organic membranes (hydrophobic as in MD or hydrophilic as in NF) are employed, disinfection of streams such as seawater is essential to prevent bacteria growth (plugs the pores of the organic membrane), and subsequent biofilm formation that would result in biological membrane fouling. Of equal importance, the residual of disinfecting agents must be removed to prevent membrane oxidation. If, for instance, sodium hypo-chlorite (free chlorine) is used as a disinfection agent, then sodium metabisulfate (also oxygen scavenger) must be added to remove the chlorine residual that persists for a long period of time, and thus preventing it from oxidizing the membrane. However, ozone is the most effective disinfectant with a residual that decomposes rapidly (e.g., half-life of ozone is about 23 minutes) in the treated water. If there is any concern about oxidizing the membrane by ozone residual, a sufficient amount of NO can be injected to decompose ozone residual (Equation (21)).

The outlet stream from the oxidation tower [20] will be fed to the MD modules [24]. The purpose of the MD modules is to further concentrate, in particular, sulfate in seawater. The distillate stream [26] from MD modules can be employed for multiple purposes at the platform. The MD concentrate stream [28] will be partially recycled, as needed, to the MD feed stream. As the concentration of sulfate increases in the MD concentrate stream to a sufficient concentration, the precipitation step [30–42] will then take place (as discussed in the MLPP method; FIG. 7, Setup A), followed by the de-oxygenation step [44] to produce nearly sulfate-free seawater [46] suitable for oil-gas fields water injection operations.

Several advantages of this processing system can be realized. First, MD can be operated at low pressures (e.g., sub-atmospheric or atmospheric) and temperatures (e.g., 45° C.), and thus seawater can be concentrated using low grade energy (e.g., wind, solar, geothermal, etc.) or waste heat (e.g., low temperature gradients typically available in platforms). Second, MD also provides a concentrate stream with higher concentrations of sodium chloride than untreated seawater. Once it is depleted of sulfate by the precipitation step, such a nearly sulfate-free concentrate stream is more compatible with formation water (total salinity and depleted sulfate). Third, the MD distillate stream (ultra-pure) can be employed for multiple uses at the platform, or it can be discharged as an environmentally benign stream.

Nanofiltration-Modified Liquid-Phase Precipitation (NF-MLPP) Method

FIG. 7 (Setup C) illustrates a single-stage NF-MLPP to treat seawater. Steps [10–22] are similar to the processing steps in the MLPP (FIG. 7, Setup A) and MD-MLPP (FIG. 7, Setup B) methods.

A more effective way in using NF [24] for the treatment of seawater is to be operated at 50% throughput ratio to produce sulfate-free permeate stream [26]. The remaining 50% as a concentrate stream [28] will be treated by the precipitation step [30–42] (as discussed in the MLPP method; FIG. 7, Setup A). After that, the nearly sulfate-free NF permeate stream [26] will be merged with the nearly sulfate-free crystallizer overflow stream [42] into a de-oxygenation tower [44] to deplete oxygen. The resulting nearly sulfate-free treated stream (with a salinity comparable to the salinity of seawater) [46] will be used in oil-gas fields water injection operations.

The advantages of this processing system can be seen as follows. First, the NF system can be operated in almost scale-free manner, which would substantially minimize the NF operating costs (e.g., addition of scale inhibitors, frequent membranes cleanup, membranes replacement, high power consumption, etc.). Second, the total salinity of the mixed NF permeate stream (less sodium chloride than seawater) and crystallizer overflow stream (higher sodium chloride than seawater) is almost equivalent to the total salinity of untreated seawater. Such a mixed stream is more compatible with formation waters than the NF permeate stream alone. Third, the final concentrate stream from the combined NF-MLPP system can be limited to less than 10% of the initial seawater feed stream.

EXAMPLE 2

Oil-Gas Fields Produced Waters

Often produced waters are mixed together from different production zones. The chemistry of such waters differs considerably from zone to zone within the same production facilities. The mixing of incompatible waters causes almost immediate scales build-up. FIG. 1 (setup B) reveals a typical design of many existing topsides facilities that separate produced hydrocarbons (oil and gas) from produced waters.

In a typical topside facility, produced fluids (hydrocarbons and water) from different blocks of production wells are mixed together at the start of the fluid treatment facilities on the platform. The mixed stream enters two-phase high-pressure (e.g., 900 psi) and intermediate-pressure separators to remove gas from the stream. Oil and produced water are passed from the separators to typically an electrical coalescer where the produced water is removed from the crude oil by electrostatic precipitation. The oily produced water can then be treated by hydrocyclones to reduce oil content (to about 40 ppm), followed by degassing drums to remove residual gases.

Table 3, as an example, presents the concentrations of inorganic species in the path of produced fluids (hydrocarbons and waters) from the reservoirs to the topside production facility (facility of Eugene Island, the Gulf of Mexico). The data clearly reveals that produced waters from Block A wells are incompatible with produced waters from Blocks B/C Wells. Block A wells produce waters with relatively high concentrations of barium, while produced waters from Blocks B/C wells are relatively high in sulfate and significantly high in calcium. The radium levels are about the same in both Block A wells and Blocks B/C wells (500 to 600 picoCuries/L), which are high. As a result, radioactive barium sulfate scale deposits (due to the co-precipitation of radium and NORM) are significant throughout the processing facility (Shuler, P. J., et al., "Control of NORM at Eugene Island 341-A", 1995 Gas Research Institute Proceedings GRI-95/0474: 143–161).

This is a classical problem of mixing incompatible waters in which scale was anticipated, and yet it was allowed to form. A better approach to solve this problem and the like is to evaluate carefully the chemistry of produced waters from different production zones, and then process the incompatible streams in separate production facilities. This approach might be impractical for some of existing or aging facilities. However, it ought to be considered in the design of new facilities.

The flow sheet that is shown in FIG. 7 (Setup A) can be used with some modifications to illustrate the operation of the CPP process. These modifications include the elimination of the poly-electrolyte injection [12], the pre-filtration unit [14], and the ozone oxidation tower [20,22]. Temperatures of processed produced waters are typically in the range of 45 to 75° C., while pressures are in the range of 150 to 250 psi.

If hydrogen sulfide is present in produced waters, or if it can be imported from a sour gas stream, then it can be converted to $SO_2$ in an aerated tower [16] where air is used as source for oxygen (not shown). However, if no source for hydrogen sulfide is available, then a sufficient amount of $SO_2$ from any an inexpensive source [18] will be added to the produced water in the aeration (absorption) tower [16]. The low-pH produced water will be fed to the crystallizer [24] where the precipitation step will take place [24–36].

The treated produced water [36] will be fed to a de-oxygenation tower [38] for oxygen removal. If the temperature of the treated produced water [40] is higher than 50° C., a cooler (not shown) can then be added.

EXAMPLE 3

Aquifers Waters

As an example, the treatment and injection of the Paradox Valley brine waters are used to illustrate the treatment of aquifers waters for oil-gas fields water injection operations.

The natural seepage of brine waters into the Dolores River in the Paradox Valley (Colo.) has led to annually increase the dissolved solids of the Colorado River by about 200 million kilograms. The Colorado River is a major source of potable water for both the United States and the Republic of Mexico. To solve this problem, about 3,540 cubic meters per day of brine waters need to be pumped from shallow brine wells located along the Dolores River into a very deep disposal well (Mississippian Leadville Limestone).

This volume of continuous pumping is essential to create a cone of depression in the brine fields near the Colorado River. The created cone of depression should presumably be filled with river water, and consequently stop the seepage of brine waters into the river. However, the injection of such brine waters with high sulfate concentration (TDS: 250,000 ppm; chloride: 150,000 ppm; sulfate: 6,000 ppm; bicarbonate: 313 ppm; calcium: 1,300 ppm) into the disposal well formation water that contains high calcium concentration (TDS: 165,000 ppm; chloride: 100,000 ppm; sulfate: 700 ppm; bicarbonate: 273 ppm; calcium: 8,000 ppm) will clearly lead to precipitate a huge mass of calcium sulfate (anhydrite) in conjunction with other precipitates at downhole. This would plug the permeable zone of the disposal well.

NF was tested for the selective removal of sulfate from the Paradox valley hyper-saline brine waters (Kharaka, Y. K., et al., "Deep Well Injection from Paradox Valley, Colo.: Potential Major Precipitation Problems Remediated by Nanofiltration", Water Resour. Res. (1997) 33: 1013–1020). Table 4 presents, at different throughput ratios ($Q_P/Q_F$), the reported values of $R_O$, $C_F$, as well as the predicted values of $R_a$, $C_m$, and $R_a \Delta \Pi_m$ using my modified film-theory model. It should be noted, however, that: (1) the concentrate stream for each throughput ratio was recycled as a feed stream for the succeeding throughput ratio (a partial recycle mode); and (2) scale inhibitors were added to mainly delay the precipitation of gypsum.

Table 4 reveals that the values of $R_O$ for the divalent ions increase slightly, while the values $R_O$ for the monovalent ions decrease slightly with increasing throughput ratios. It appears that the addition of the scale inhibitor to the tested hyper-saline brine water has contributed in preventing the expected decline in the values of $R_O$ as throughput ratio increases.

The salinity of the Paradox Valley brine waters is about 7 times higher than the salinity of seawater. Table 4 also presents the predicted values of $R_a \Delta \Pi_m$ at different throughput ratios. The exact applied operating pressures ($\Delta P$) for each increment in the throughput ratio were not reported. However, it was reported that the operating pressures were between 290 and 870 psi. It appears that the predicted values of the $R_a \Delta \Pi_m$ were within the range of the reported operating pressures. At about 80% throughput ratio ($R_a \Delta \Pi_m$: 842 psi), gypsum precipitation was observed, followed by substantial precipitation at 84% throughput ratio ($R_a \Delta \Pi_m$: 869 psi). In these cases, the values of $R_a \Delta \Pi_m$ were approaching the maximum operating pressure (870 psi), at which the operation of the NF system was ceased.

Although a significant portion of sodium chloride (92 to 95%) passes through the NF membrane, the osmotic pressures are significantly high. This is attributable to the: (1) very high salinity (250,000 mg/L) of the brine waters in which sodium chloride is by far the predominant salt (about 92% of the total salts); and (2) operation at high throughput ratios (higher applied pressures) which results in build-up of very high concentrations of sodium chloride at the membrane surface (e.g., at 70% throughput ratio, chloride concentration is 44% more than its concentration in the bulk feed stream). It should be noted, however, that the structural pressure limits of most NF modules (e.g., spiral wounds) are about 600 psi.

The Paradox Valley brine waters are near saturation with respect to gypsum and calcite. However, the exact rejection values along with feed concentrations for the alkalinity (bicarbonate ion) were not reported. At 70% throughput ratio, the concentration of sulfate at the membrane surface ($C_m$) is about 53,500 mg/L (calcium concentration is about 4,850 mg/L), and in the concentrate stream ($C_c$) is 22,900 mg/L (calcium concentration is about 2,330 mg/L). This indicates that the local concentration of gypsum at the membrane surface, and in the concentrate stream is at super saturation. In the operation of a full scale NF system (not a small bench-scale NF setup with limited operation for few hours), the gypsum builds up at the membrane surface, and in the concentrate stream could not be sustainable even with the addition of the most effective scale inhibitors.

The NF concentrate stream from the treated Paradox Valley brine water represents a large secondary waste stream, which is an additional critical problem. Unlike the disposal of the NF concentrate stream from offshore seawater treatment, the disposal of such a highly hyper-saline brine water that is supersaturated with gypsum, is a challenge. Even if the NF system is operated at 70% throughput ratio, which is almost practically impossible, the remaining 30% of the concentrate stream is equivalent to 1,062 cubic meters per day of concentrated brine waters. One of the suggested options was to release the NF concentrate stream into the Dolores river. This option was based on the assumptions that the released concentrated brine water: (1) will be quickly diluted, and thus will prevent gypsum precipitation; and (2) will result in 70% less of total salts load (60 million kilograms) than the current annual addition from the Paradox Valley (200 million kilograms).

Such assumptions, however, are very questionable. First, gypsum is less soluble in potable water such as the Dolores river (about 2,300 mg/L) than in saline waters (e.g., 3,500 mg/L in seawater). Second, if the dispersion of gypsum into the Dolores river is not fast enough (e.g., not enough currents at the disposal sites and shallow river combined with the low aqueous solubility limit of gypsum), gypsum builds up could take place on the floor of the river. Third, the total salinity of the NF concentrated brine stream is about 10% higher than the total salinity of the untreated brine water. As such, the released concentrated brine water will add annually 80, not 60 million kilograms of the total salts load.

Any of the three setups (A, B and C) that are shown in FIG. 7 can be applied to treat the Paradox Valley brine waters. The only modification in the flow sheets as given in FIG. 7 is the elimination of the poly-electrolyte [12], and the ozone oxidation tower [20,22]. The pre-filters [14] could be simpler than seawater's pre-filters, and in some cases of clean aquifers waters such pre-filters might be eliminated. If, however, excessive concentrations of gases (e.g., methane, ethane, propane, carbon dioxide, etc.) are present in the aquifer waters, then a degassing drum (not shown) can be added before the adsorption-aeration tower of $SO_2$.

The Paradox Valley brine waters are near saturation with respect to gypsum and calcite, and contain appreciable concentration of hydrogen sulfide (10 to 100 mg/L). As such, the MLPP process as a stand alone (FIG. 7, Setup A) is more economically feasible than the MD-MLPP or NF-MLPP methods (e.g., less capital cost). Hydrogen sulfide will be converted to $SO_2$ in the aeration tower where air can be used as a source for oxygen.

The concentrate slurry of the MLPP which contains high concentration of gypsum can be limited to 5–10%. If such a slurry is de-watered, the resulting dry gypsum can be used, for instance: (1) to refill mined-out areas; (2) as a land filler in mountainous areas changing rocky valleys into cultivated land; (3) as a soil conditioner to combat the effect of sodium; (4) to generate ammonium sulfate as a fertilizer; and (5) in the cement industry as a setting retarder.

If the NF-MLPP is chosen to treat the Paradox valley brine waters, then the NF can be operated at, for instance, 30% throughput ratio (30% permeate stream, and 70% concentrate stream that needs to be treated by the precipitation step). This would make NF more feasible without significant operational problems and maintenance cost.

EXAMPLE 4

Abatement of Gases Using the Alkalinity of Natural Saline Waters

The alkalinity of natural saline waters (e.g., seawater, oil-gas fields produced waters, and any other formation waters) could be an excellent absorption agent for the abatement of acid gases such as $H_2S$, $SO_2$, $CO_2$, $NO$, $NO_2$, and the like. However, gases with very limited aqueous solubility such as $H_2S$ or $NO$ ought to be converted to other forms of gases that have higher aqueous solubility. For instance, $H_2S$ can be oxidized to $SO_2$, while $NO$ can be oxidized to $NO_2$, and/or can be reacted with $NO_2$ to form $N_2O_3$.

Alkalinity in the form of $CaCO_3$, or in the form of $Mg(OH)_2$ can be used for individual or simultaneous absorption of $SO_2$, $NO_2$, and $N_2O_3$. $SO_2$ can be absorbed by $CaCO_3$ to form calcium sulfite which, in turn, can be used as an absorbing agent for $NO_2$ (if $NO_2$ exists in the gas stream). $Mg(OH)_2$ slurry can also be a suitable absorbing agent for both $SO_2$ and $NO_2$.

The treatment of acidic gases is equivalent but opposite to the treatment of a natural saline water. In the treatment of natural saline water, alkalinity is converted to sulfite (and then sulfate) by adding a sufficient amount of an acidic gas. In acid gases treatment, however, a sufficient amount of alkalinity is required for effective absorption, and thus the concentrations of acid gases determine the needed amount of alkalinity.

The alkalinity concentration in any given natural saline water is limited, while the concentrations of acid gases vary depending on their emitting sources. If the amount of acidic gases that need to be absorbed is higher than the total alkalinity of the used natural saline water, then a large volume of such water is required to provide sufficient absorption capacity. This would require larger processing equipment, and thus higher capital and operating costs. As such, the concentration of alkalinity ought to match the concentration of acid gases (or vice versa) to provide optimum absorption capacity.

If seawater is used as a source for natural alkalinity, then it requires pretreatment. Part of the pretreatment is the use of disinfectant. Ozone can be used as a disinfecting and oxidizing agent. Oxygen is very critical for seawater marine environment. When $CaCO_3$ is used to absorb and convert $SO_2$ to sulfite, then sulfite that depletes oxygen ought to be converted to sulfate before discharging the spent seawater. A high pH media such aqueous amine solution increases the rate of oxidation.

Figure 8:
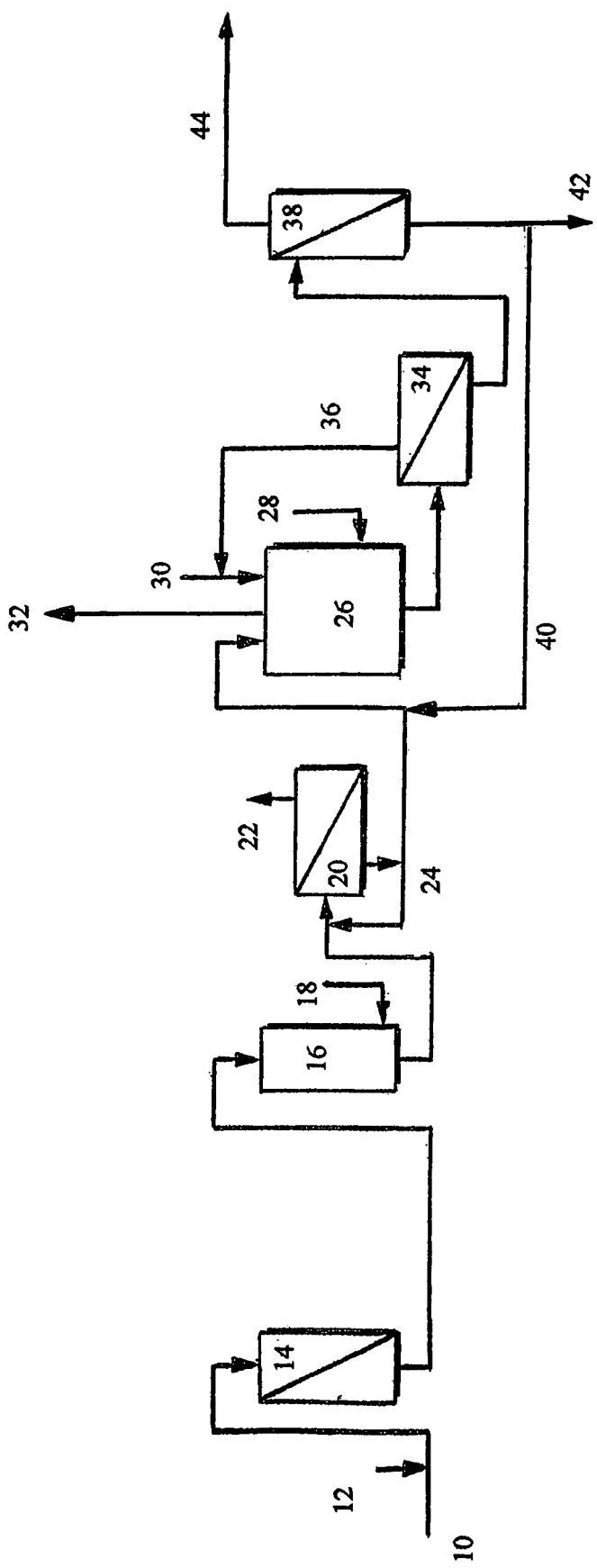
FIG. 8 illustrates processing schemes for the treatment of acid gases using the alkalinity of saline waters.

FIG. 8 illustrates a possible simplified flow sheet for the use of alkalinity in natural saline waters for the abatement of acid gases. If seawater is used as an alkalinity source, then it [10] will be intermixed with poly-electrolytes [12] to coagulate suspended matters for ease of filtration with multi-media filters [14]. A pre-oxidation tower [16] will be used to inject ozone [18] as an effective bactericidal to destroy the bacteria content present in the filtered seawater. Ozone would also serve as a powerful oxidizer to oxidize, for instance, $H_2S$ to $SO_2$, or $NO$ to $NO_2$ (if they present in the gaseous stream).

The pre-oxidation tower stream will be fed to the MD modules [20]. The purpose of the MD modules is to further concentrate the total alkalinity of seawater. The distillate stream [22] from MD modules can be used for multiple purposes at the platform or it can be discharged as a harmless stream. The MD concentrate stream [24] will be partially recycled, as needed, to the MD feed stream. As the concentration of alkalinity increases in the MD concentrate stream to a sufficient concentration (enough for adequate absorption), the concentrate stream will then be fed to an absorption tower [26] where it will be reacted with the targeted acidic gas (or gases) [28]. A small, but a sufficient amount, of an amine solvent [30] will also be added to raise the pH for faster oxidation reaction. This would help in rapidly converting $SO_2$ to mainly sulfite (that can also be used as an absorbent for $NO_2$), and then to sulfate. The treated gas stream can be vented from the top of the absorption tower [32]. The possible loss of the amine solvent from the absorption tower can be minimized by adding a mist eliminator (not shown, e.g., mesh combines with wash water) at the upper section of the absorption tower [26].

The outlet stream from the absorption tower will enter a stripping unit [34] to recover the amine solvent. The stripper could be a vacuum membrane distillation unit, or a simple flashing drum, or a simple vacuum or standard distillation tower, or a pervaporation unit. The recovered amine solvent [36] will be recycled back to the absorption tower [26].

The formed precipitates will be separated from the treated seawater by stages of hydrocyclones [38]. A portion of the hydrocyclones under flow (concentrate) stream [40] will be recycled to the feed stream of the absorption tower. The recycled slurry of the precipitated sulfite and sulfate will be used to enhance the absorption of $SO_2$ (and $NO_2$ if exists) in the absorption tower [26]. The remaining of the hydrocyclones under flow stream [42] and over flow stream [44] will be discharged to the sea. It should be noted that, for instance, the MD distillate steam [22] can be mixed with the hydrocyclones streams [42] and/or [44] to enhance the oxygen concentration before discharging to the sea.

Since the volume of the hydrocyclones over flow stream is not critical (as is the case with treating saline water for oil-gas fields water injection operations), the under flow stream can be 80% or more of the hydrocyclones feed stream. This would: (1) allow the slurry of sulfite to re-dissolve, and upon mixing with the MD concentrate stream [24], sulfite will re-dissolve further (soluble sulfite is a more effective absorption agent than insoluble sulfite slurry); and (2) minimize, to some extent, the amount of saline water that needs to be used for gas absorption (lower capital and operating costs).

NF instead of MD [20] can also be used to concentrate the alkalinity of natural saline waters as shown in FIG. 8. NF, for instance, can be operated at 20 to 30% throughput ratio. The 70 to 80% NF concentrate stream [24] will be fed to the absorption tower [26], while the NF permeate stream [22] will be mixed with the hydrocyclones under flow [42] and over flow [44] streams to enhance the oxygen content before discharging to the sea.

MD or NF [20] can be eliminated from the flow sheet that is shown in FIG. 8 using the MLPP process alone to treat acid gases. This processing setup (without MD or NF) is based on the assumption that the recycled sulfite slurry from the hydrocyclones under flow stream could provide sufficient absorption capacity.

Formation waters (e.g., oil-gas fields produced waters or aquifers waters) can also be employed as a source for natural alkalinity, particularly for sour natural gas treatment from remote facility. Such waters require much less pretreatment than seawater. The addition of disinfectant is not required. As such, the poly-electrolyte [12], and the ozone oxidation tower [16,18] as given in FIG. 8 can be eliminated. Since formation water is typically depleted of oxygen, it does not require the conversion of sulfite to sulfate. The spent formation can then be re-injected into a proper (compatible water) disposal well.

EXAMPLE 5

Abatement of Gases Using Primary Amines as Absorption Media

Figure 9:
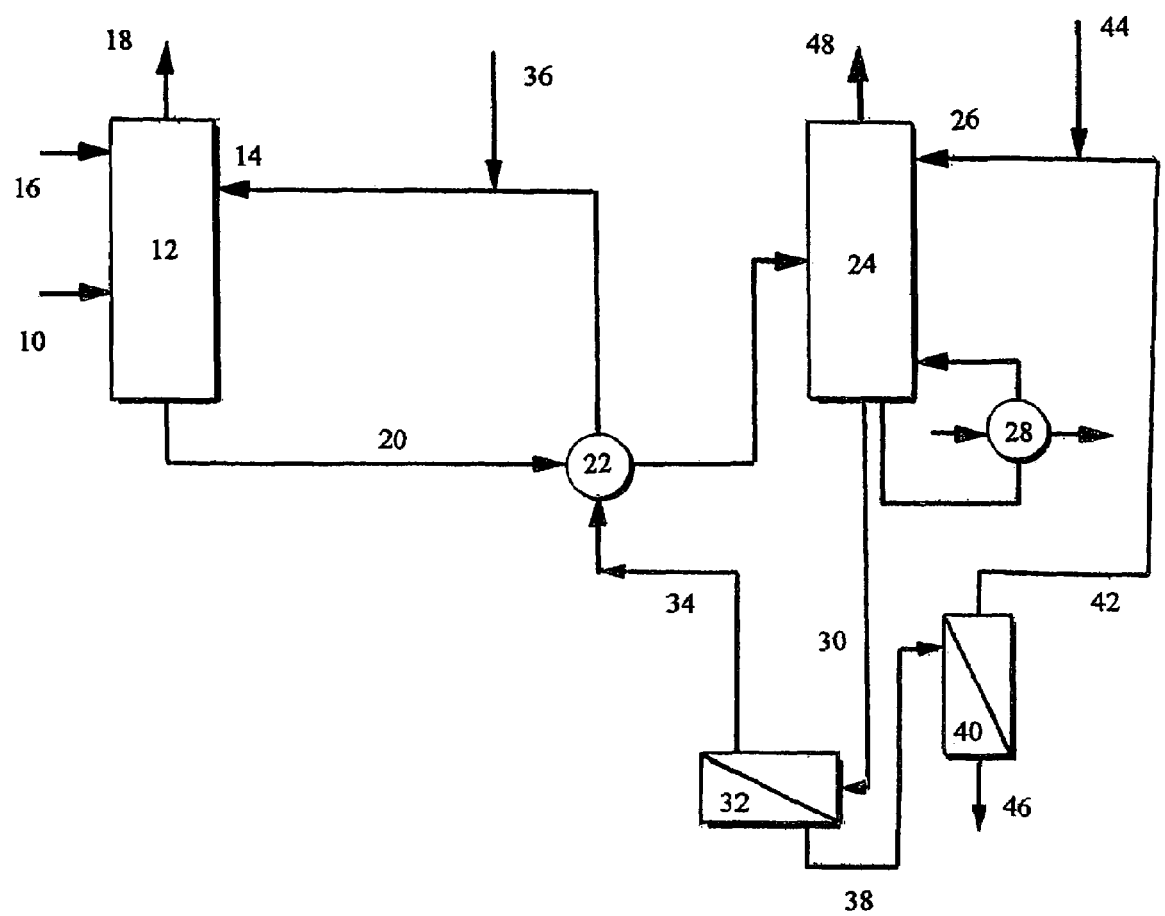
FIG. 9 illustrates a processing scheme for the treatment of acid gases by direct absorption.

FIG. 9 illustrates a possible simplified flow sheet to use the CPP process for direct absorption of gases such as $H_2S$, $SO_2$, $CO_2$, $NO$, $NO_2$, radon and the like. These gases have, with varying degrees, very low aqueous solubilities, and partial or incomplete homogeneity in primary amines.

The targeted gas (or gases) [10] enters an absorption tower [12] where it will be contacted with an amine solvent [14]. The amine solvent can be injected into the absorption tower as a gas-phase, or as a compressed aqueous-liquid phase. For safety purposes, the amine aqueous-liquid phase injection (wet method) may be preferred over the amine gas-phase injection (dry method). The possible loss of the amine solvent from the absorption tower can be minimized by adding a mist eliminator [16] (e.g., mesh combines with wash water) at the upper section of the tower. The treated gas will be vented from the top of the absorption tower [18].

If the absorption tower is operated at near ambient temperature, then a heat exchanger [22] will be used for heating the gas-rich amine stream [20] to produce buoyancy. The amine solvent will then be separated from the absorbed gas in a re-generating tower [24]. Since the targeted gas (or gases) are sparingly soluble in water, and their solubility decreases with increasing temperature, while primary amines are miscible with water, water in an optimum quantity can be injected at the upper section [26] of the re-generating tower [24]. Depending on the processing conditions, a heater [28] can be used to raise the temperature of the gas-amine-water mixture in the re-generating tower to release the absorbed gas that is nearly insoluble from the amine-water mixture.

The amine-water mixture [30] will be fed into a stripping unit [32] to recover the amine solvent. The stripping unit could be vacuum membrane distillation, or a simple flashing drum, or simple vacuum or standard distillation tower, or pervaporation. A make-up amine solvent [36] will be added to the recycled amine [34] from the stripping unit [32] for reuse in the absorption tower [12]. The amine-stripped water stream [38] from the stripping unit will be fed to hydrocyclones [40] to purify the water stream from any precipitates.

The purified over flow stream [42] from the hydrocyclones will be recycled for reuse in the re-generating tower [24]. A make-up water [44] can also be added as needed to the re-generating tower. The under flow stream [46], which contains the formed precipitates, can be limited to between 5 and 10% of the total hydrocyclones feed stream. The released gas [48], which is in a near pure-state, can be disposed of, or used in any related applications (e.g., $CO_2$ can be used for enhanced oil recovery).

This inventive process is applicable to high-pressure natural gas applications as well as a number of low-pressure direct treatment applications such as gas streams from $CO_2$ floods, gasifier syngas, and refinery fuel gas.

TABLE 1

Possible Sources of Waters for Injection Operations: Arabian Gulf

| Ion | Seawater | Brine Waters (BW) | | Aquifers Waters (AW) | | |
|---|---|---|---|---|---|---|
| | | BW1 | BW2 | AW1 | AW2 | AW3 |
| Cations | | | | | | |
| $Na^+$ | 14,161 | 68,195 | 83,692 | 65,907 | 61,134 | 53,201 |
| $K^+$ | 722 | 4,361 | 5,389 | NR | NR | NR |
| $Mg^{+2}$ | 1,642 | 1,903 | 1,879 | 4,950 | 5,069 | 3,440 |
| $Ca^{+2}$ | 530 | 19,483 | 15,769 | 24,570 | 25,110 | 8,637 |
| $Sr^{+2}$ | 15 | 1,090 | 1,035 | NR | NR | NR |
| $Ba^{+2}$ | NR | NR | 5 | NR | NR | NR |
| $Fe^{+2}$ | 1.3 | NR | 4 | NR | NR | NR |
| Anions | | | | | | |
| $Cl^-$ | 25,491 | 147,910 | 167,604 | 159,180 | 152,980 | 106,004 |
| $HCO_3^-$ | 138 | 256 | 42 | 60 | 122 | 210 |
| $SO_4^{-2}$ | 3,495 | 287 | 663 | 350 | 500 | 1,596 |

Seawater (Arabian Gull)
BW1: Umm Shaif Oil-Fields Produced Waters; BW2: Zakum Oil-Fields Produced Waters
AW1 to AW3: Abu Dhabi Aquifers Waters
NR: Not Reported
Ions Concentrations (mg/L)

TABLE 2

Treatment of Seawater by NF: Data Analysis

| | Experimental | | | | Modified Film Theory Model | |
|---|---|---|---|---|---|---|
| Ion | $R_O$ | $C_F$ | $C_P$ | $C_C$ | $R_a$ | $C_m$ |
| Throughput Ratio = 0.05 | | | | | | |
| $Na^+$ | 31.0 | 9400 | 6500 | 9553 | 37.4 | 10377 |
| $K^+$ | 31.0 | 358 | 248 | 364 | 37.1 | 394 |
| $Mg^{+2}$ | 82.0 | 1080 | 195 | 1127 | 84.9 | 1287 |
| $Ca^{+2}$ | 67.0 | 328 | 108 | 340 | 71.4 | 378 |
| $Sr^{+2}$ | 75.0 | 6 | 1.5 | 6 | 78.3 | 7 |
| $Cl^-$ | 33.0 | 16900 | 11300 | 17195 | 40.4 | 18957 |
| $HCO_3^-$ | 70.0 | 122 | 37 | 127 | 74.2 | 143 |
| $SO_4^{-2}$ | 99.0 | 2460 | 14 | 2589 | 99.6 | 3220 |
| | $\Delta P = 58.0$ | | | | $R_a \Delta \Pi_m = 56.9$ | |
| Throughput Ratio = 0.50 | | | | | | |
| $Na^+$ | 16.0 | 9400 | 7900 | 10874 | 43.0 | 13868 |
| $K^+$ | 17.0 | 358 | 297 | 418 | 42.8 | 519 |
| $Mg^{+2}$ | 69.0 | 1080 | 338 | 1809 | 87.6 | 2735 |
| $Ca^{+2}$ | 50.0 | 328 | 163 | 490 | 76.0 | 678 |
| $Sr^{+2}$ | 58.0 | 6 | 2.5 | 9 | 82.1 | 14 |
| $Cl^-$ | 17.0 | 16900 | 14100 | 19652 | 46.2 | 26203 |
| $HCO_3^-$ | 47.0 | 122 | 65 | 178 | 78.4 | 302 |

TABLE 2-continued

Treatment of Seawater by NF: Data Analysis

| | Experimental | | | | Modified Film Theory Model | |
|---|---|---|---|---|---|---|
| Ion | $R_O$ | $C_F$ | $C_P$ | $C_C$ | $R_a$ | $C_m$ |
| $SO_4^{-2}$ | 98.0 | 2460 | 30 | 4848 | 99.7 | 8732 |
| | | $\Delta P = 362.6$ | | | $R_a \Delta \Pi_m = 104.6$ | |
| | | Throughput Ratio = 0.75 | | | | |
| $Na^+$ | 7.0 | 9400 | 8700 | 12000 | 43.0 | 15272 |
| $K^+$ | 8.0 | 358 | 330 | 428 | 42.8 | 577 |
| $Mg^{+2}$ | 57.0 | 1080 | 467 | 2850 | 87.6 | 3779 |
| $Ca^{+2}$ | 38.0 | 328 | 202 | 701 | 76.0 | 840 |
| $Sr^{-2}$ | 50.0 | 6 | 3 | 14 | 82.1 | 17 |
| $Cl^-$ | 7.0 | 16900 | 15700 | 21600 | 46.2 | 29176 |
| $HCO_3^-$ | 37.0 | 122 | 77 | 277 | 78.4 | 357 |
| $SO_4^{-2}$ | 98.0 | 2460 | 60 | 9660 | 99.7 | 17465 |
| | | $\Delta P = 435.1$ | | | $R_a \Delta \Pi_m = 117.3$ | |

$R_O$ and $R_a$ (in %); $C_F$, $C_P$, $C_C$ and $C_m$ (in ppm); $\Delta P$ and $R_a \Delta \Pi_m$ (in psi)

TABLE 3

Profiles of Some Incompatible Produced Waters
(Eugene Island 341-A, Gulf of Mexico)

| Species | Block A Wells | Block B/C Wells |
|---|---|---|
| Cations | | |
| $Na^+$ | 60,000 | 110,000 |
| $Mg^{+2}$ | 1,000 | 1,200 |
| $Ca^{+2}$ | 4,000 | 4,000 |
| $Sr^{+2}$ | 150 | 150 |
| $Ba^{+2}$ | 50 | 1 |
| $Fe^{+2}$ | 25 | 50 |
| Anions | | |
| $Cl^-$ | 95,000 | 190,000 |
| $HCO_3^-$ | 50 | 50 |
| $SO_4^{-2}$ | 10 | 500 |

What is claimed is:

1. A method of producing petroleum, gas, or other products from a subterranean formation using seawater, said method comprising the steps of:
   (a) converting an alkalinity of said seawater to a sulfate by adding an acid gas in an amount sufficient to react with said alkalinity of said seawater and adding an amount of ozone effective to operate as a bactericidal agent and to accelerate the reaction of said acid gas with said alkalinity to form said sulfate;
   (b) removing said sulfate from said seawater by
      (i) adding an amine solvent to said seawater effective to form a precipitate comprising said sulfate,
      (ii) removing at least most of said amine solvent from said seawater by stripping, and
      (iii) after step (ii), removing said precipitate from said seawater to produce a treated seawater product having at least most of said sulfate removed therefrom; and
   (c) injecting said treated seawater product into said subterranean formation.

2. The method of claim 1 wherein said acid gas is sulfur dioxide or oxidized hydrogen sulfide.

3. The method of claim 1 wherein said amine solvent is isopropylamine, propylamine, diisopropylamine, ethylamine, diethylamine, methylamine, dimethylamine, or a combination thereof.

4. The method of claim 1 wherein said amine solvent is stripped from said seawater by vacuum membrane distillation, vacuum distillation, distillation, pervaporation, or flash tank stripping.

5. A method of producing petroleum, gas, or other products from a subterranean formation using seawater, said method comprising the steps of:
   (a) converting an alkalinity of said seawater to a sulfate by adding an acid gas in an amount sufficient to react with said alkalinity of said seawater and adding an amount of ozone effective to operate as a bactericidal agent and to accelerate the reaction of said acid gas with said alkalinity to form said sulfate;

TABLE 4

Treatment of the Paradox Valley Brine Water by NF: Data Analysis

| | TR | $Na^+$ | $K^+$ | $Mg^{+2}$ | $Ca^{+2}$ | $Sr^{+2}$ | $Cl^-$ | $SO_4^{-2}$ |
|---|---|---|---|---|---|---|---|---|
| $C_F/R_O$ | 0.20 | 86,400/08.10 | 4,430/14.67 | 1,880/70.96 | 1,400/42.07 | 30/63.33 | 142,000/06.34 | 7,110/98.96 |
| $C_m/R_a$ | 0.20 | 90,963/12.71 | 4,721/19.94 | 2,216/75.36 | 1,620/49.93 | 40/72.52 | 152,717/12.91 | 9,101/99.19 |
| $R_a \Delta \Pi_m = 56.5$ psi | | | | | | | | |
| $C_F/R_O$ | 0.40 | 88,000/08.52 | 4,480/13.62 | 2,270/72.25 | 1,560/43.72 | 36/66.67 | 147,000/08.84 | 9,030/99.13 |
| $C_m/R_a$ | 0.40 | 103,947/22.56 | 5,797/33.25 | 4,483/85.95 | 2,629/66.61 | 75/84.07 | 173,731/22.87 | 19,353/99.59 |
| $R_a \Delta \Pi_m = 208.4$ psi | | | | | | | | |
| $C_F/R_O$ | 0.50 | 86,800/04.84 | 4,460/08.97 | 2,500/71.20 | 1,630/42.27 | 39/64.10 | 146,000/05.48 | 10,500/99.21 |
| $C_m/R_a$ | 0.50 | 112,674/26.69 | 6,588/38.37 | 6,224/88.43 | 3,287/71.37 | 106/86.84 | 189,146/27.04 | 25,396/99.67 |
| $R_a \Delta \Pi_m = 326.4$ psi | | | | | | | | |
| $C_F/R_O$ | 0.60 | 88,500/04.75 | 4,610/08.24 | 2,930/71.54 | 1,790/43.02 | 45/64.44 | 149,000/05.37 | 13,200/99.27 |
| $C_{m/Ra}$ | 0.60 | 121,131/30.41 | 7,390/42.76 | 8,485/90.17 | 4,072/74.95 | 143/88.79 | 203,709/30.78 | 35,596/99.73 |
| $R_a \Delta \Pi_m = 467.9$ psi | | | | | | | | |
| $C_F/R_O$ | 0.70 | 90,100/05.44 | 4,790/13.99 | 3,510/72.36 | 1,990/45.73 | 54/66.67 | 152,000/04.61 | 16,800/99.26 |
| $C_m/R_a$ | 0.70 | 128,628/33.76 | 7,711/46.57 | 11,352/91.46 | 4,850/77.73 | 184/90.23 | 220,237/34.16 | 53,496/99.77 |
| $R_a \Delta \Pi_m = 643.2$ psi | | | | | | | | |
| $C_F/R_O$ | 0.80 | 91,700/05.34 | 4,940/11.74 | 4,490/73.05 | 2,330/47.64 | 68/69.12 | 152,000/02.63 | 22,900/99.24 |
| $C_m/R_a$ | 0.80 | 137,364/36.81 | 8,703/49.90 | 16,011/92.44 | 6,087/79.96 | 243/91.35 | 235,764/37.23 | 84,591/99.80 |
| $R_a \Delta \Pi_m = 842.3$ psi | | | | | | | | |
| $C_F/R_O$ | 0.84 | 92,200/05.87 | 5,020/12.15 | 4,990/73.55 | 2,480/49.19 | 74/70.27 | 149,000/04.03 | 26,400/98.22 |
| $C_m/R_a$ | 0.84 | 139,893/37.95 | 9,022/51.12 | 18,273/92.78 | 6,538/80.73 | 266/91.73 | 232,039/38.37 | 105,753/99.81 |
| $R_a \Delta \Pi_m = 869.2$ psi | | | | | | | | |

TR: Throughput Ratio; $C_F$ and $C_m$ (in mg/L)

(b) removing said sulfate from said seawater by
  (i) concentrating said seawater by membrane distillation to produce sulfate-concentrated seawater,
  (ii) adding an amine solvent to said sulfate-concentrated seawater to form a precipitate comprising said sulfate,
  (iii) removing at least most of said amine solvent from said sulfate-concentrated seawater by stripping, and
  (iv) after step (iii), removing said precipitate from said sulfate-concentrated seawater to produce a treated seawater product having at least most of said sulfate removed therefrom; and
(c) injecting said treated seawater product into said subterranean formation.

6. The method of claim 5 wherein said acid gas is sulfur dioxide or oxidized hydrogen sulfide.

7. The method of claim 5 wherein said amine solvent is isopropylamine, propylamine, diisopropylamine, ethylamine, diethylamine, methylamine, dimethylamine, or a combination thereof.

8. The method of claim 5 wherein said amine solvent is stripped from said sulfate-concentrated seawater by vacuum membrane distillation, vacuum distillation, distillation, pervaporation, or flash tank stripping.

9. A method of producing petroleum, gas, or other products from a subterranean formation using seawater, said method comprising the steps of:
(a) converting an alkalinity of said seawater to a sulfate by adding an acid gas in an amount sufficient to react with said alkalinity of said seawater, and adding an amount of ozone effective to operate as a bactericidal agent and to accelerate the reaction of said acid gas with said alkalinity to form said sulfate;
(b) removing said sulfate from said seawater by
  (i) concentrating said seawater by nanofiltration to produce sulfate-concentrated seawater and nearly sulfate-free seawater,
  (ii) adding an amine solvent to said sulfate-concentrated seawater to form a precipitate comprising said sulfate,
  (iii) removing at least most of said amine solvent from said sulfate-concentrated seawater by stripping,
  (iv) removing said precipitate from said sulfate-concentrated seawater to produce sulfate-treated seawater having at least most of said sulfate removed therefrom,
  (v) after step (iv), mixing said nearly sulfate-free seawater with said sulfate-treated seawater to produce a treated seawater product; and
(c) injecting said treated seawater product into said subterranean formation.

10. The method of claim 9 wherein said acid gas is sulfur dioxide or oxidized hydrogen sulfide.

11. The method of claim 9 wherein said amine solvent is isopropylamine, propylamine, diisopropylamine, ethylamine, diethylamine, methylamine, dimethylamine or a combination thereof.

12. The method of claim 9 wherein said amine solvent is stripped from said sulfate-concentrated seawater by vacuum membrane distillation, vacuum distillation, distillation, pervaporation, or flash tank stripping.

13. A method of producing petroleum, gas, or other products from a subterranean formation using formation water, said method comprising the steps of:
(a) converting an alkalinity of said formation water to a sulfate by adding an acid gas in an amount sufficient to react with said alkalinity of said formation water and adding a sufficient amount of oxygen to accelerate the reaction of said acid gas with said alkalinity to form said sulfate;
(b) removing said sulfate from said formation water by
  (i) adding an amine solvent to said formation water effective to form a precipitate comprising said sulfate,
  (ii) removing at least most of said amine solvent from said formation water by stripping, and
  (iii) after step (ii), removing said precipitate from said formation water to produce a treated formation water product having at least most of said sulfate removed therefrom; and
(c) injecting said treated formation water product into said subterranean formation.

14. The method of claim 13 wherein said formation water is selected from the group consisting of oil-gas field produced waters, methane coal-bed produced waters, aquifer waters, and combinations thereof.

15. The method of claim 13 wherein said acid gas is sulfur dioxide or oxidized hydrogen sulfide.

16. The method of claim 13 wherein said amine solvent is isopropylamine, propylamine, diisopropylamine, ethylamine, diethylamine, methylamine, dimethylamine, or a combination thereof.

17. The method of claim 13 wherein said amine solvent is stripped from said formation water by vacuum membrane distillation, vacuum distillation, distillation, pervaporation, or flash tank stripping.

18. A method of producing petroleum, gas, or other products from a subterranean formation using formation water, said method comprising the steps of:
(a) converting an alkalinity of said formation water to a sulfate by adding an acid gas in an amount sufficient to react with said alkalinity of said formation water and adding a sufficient amount of oxygen to accelerate the reaction of said acid gas with said alkalinity to form said sulfate;
(b) removing said sulfate from said formation water by
  (i) concentrating said formation water by membrane distillation to produce sulfate-concentrated formation water,
  (ii) adding an amine solvent to said sulfate-concentrated formation water to form a precipitate comprising said sulfate,
  (iii) removing at least most of said amine solvent from said sulfate-concentrated formation water by stripping, and
  (iv) after step (iii), removing said precipitate from said sulfate-concentrated formation water to produce a treated formation water product having at least most of said sulfate removed therefrom; and
(c) injecting said treated formation water product into said subterranean formation.

19. The method of claim 18 wherein said formation water is selected from the group consisting of oil-gas field produced waters, methane coal-bed produced waters, aquifer waters, and combinations thereof.

20. The method of claim 18 wherein said acid gas is sulfur dioxide or oxidized hydrogen sulfide.

21. The method of claim 18 wherein said amine solvent is isopropylamine, propylamine, diisopropylamine, ethylamine, diethylamine, methylamine, dimethylamine, or a combination thereof.

22. The method of claim 18 wherein said amine solvent is stripped from said sulfate-concentrated formation water by vacuum membrane distillation, vacuum distillation, distillation, pervaporation, or flash tank stripping.

23. A method of producing petroleum, gas, or other products from a subterranean formation using formation water, said method comprising the steps of:
  (a) converting an alkalinity of said formation water to a sulfate by adding an acid gas in an amount sufficient to react with said alkalinity of said formation water and adding a sufficient amount of oxygen as an oxidizer to accelerate the reaction of said acid gas with said alkalinity to form said sulfate;
  (b) removing said sulfate from said formation water by
    (i) concentrating said formation water by nanofiltration to produce sulfate-concentrated formation water and nearly sulfate-free formation water,
    (ii) adding an amine solvent to said sulfate-concentrated formation water to form a precipitate comprising said sulfate,
    (iii) removing at least most of said amine solvent from said sulfate-concentrated formation water by stripping,
    (iv) removing said precipitate from said sulfate-concentrated formation water to produce sulfate-treated formation water having at least most of said sulfate removed therefrom, and
    (v) after step (iv), mixing said nearly sulfate-free formation water with said sulfate-treated formation water to produce a treated formation water product; and
  (c) injecting said treated formation water product into said subterranean formation.

24. The method of claim 23 wherein said formation water is selected from the group consisting of oil-gas field produced waters, methane coal-bed produced waters, aquifer waters, and combinations thereof.

25. The method of claim 23 wherein said acid gas is sulfur dioxide or oxidized hydrogen sulfide.

26. The method of claim 23 wherein said amine solvent is isopropylamine, propylamine, diisopropylamine, ethylamine, diethylamine, methylamine, dimethylamine, or a combination thereof.

27. The method of claim 23 wherein said amine solvent is stripped from said sulfate-concentrated formation water by vacuum membrane distillation, vacuum distillation, distillation, pervaporation, or flash tank stripping.

28. A method for the treatment of an acid gas from a gaseous stream using the alkalinity of seawater, said method comprising the steps of:
  (a) adding an amount of ozone to said seawater effective to operate as a bactericidal agent and effective for at least one of oxidizing hydrogen sulfide to sulfur dioxide and oxidizing nitrogen monoxide to nitrogen dioxide;
  (b) absorbing said acid gas from said gaseous stream by
    (i) concentrating the alkalinity of said seawater by membrane distillation in a manner effective to produce increased absorption capacity,
    (ii) adding said gaseous stream to said seawater in an absorption tower for absorption of said acid gas,
    (iii) adding an amine solvent to said absorption tower effective to provide an enhanced oxidation rate of said acid gas absorbed in said absorption tower,
    (iv) removing at least most of said amine solvent from said seawater by stripping to produce spent seawater, and
    (v) after step (iv), removing a precipitated sulfite-sulfate slurry from the spent seawater and recycling a portion of said sulfite-sulfate slurry to said absorption tower; and
  (c) discharging said spent seawater to the sea.

29. The method of claim 28 wherein said acid gas is hydrogen sulfide, sulfur dioxide, nitrogen monoxide, nitrogen dioxide, carbon dioxide, or a combination thereof.

30. The method of claim 28 wherein said amine solvent is isopropylamine, propylamine, diisopropylamine, ethylamine, diethylamine, methylamine, dimethylamine, or a combination thereof.

31. The method of claim 28 wherein said amine solvent is stripped from said seawater by vacuum membrane distillation, vacuum distillation, distillation, pervaporation, or flash tank stripping.

32. A method for the treatment of an acid gas from a gaseous stream using the alkalinity of seawater, said method comprising the steps of:
  (a) adding an amount of ozone to said seawater effective to operate as a bactericidal agent and effective for at least one of oxidizing hydrogen sulfide to sulfur dioxide and oxidizing nitrogen monoxide to nitrogen dioxide;
  (b) absorbing said acid gas from said gaseous stream by
    (i) concentrating the alkalinity of said seawater by nanofiltration in a manner effective to produce increased absorption capacity,
    (ii) adding said gaseous stream to said seawater in an absorption tower for absorption of said acid gas,
    (iii) adding an amine solvent to said absorption tower effective to provide an enhanced oxidation rate of said acid gas absorbed in said absorption tower,
    (iv) removing at least most of said amine solvent from said seawater by stripping to produce spent seawater, and
    (v) after step (iv), removing a precipitated sulfite-sulfate slurry from the spent seawater and recycling a portion of said sulfite-sulfate slurry to said absorption tower; and
  (c) discharging said spent seawater to the sea.

33. The method of claim 32 wherein said acid gas is hydrogen sulfide, sulfur dioxide, nitrogen monoxide, nitrogen dioxide, carbon dioxide, or a combination thereof.

34. The method of claim 32 wherein said amine solvent is isopropylamine, propylamine, diisopropylamine, ethylamine, diethylamine, methylamine, dimethylamine, or a combination thereof.

35. The method of claim 32 wherein said amine solvent is stripped from said seawater by vacuum membrane distillation, vacuum distillation, distillation, pervaporation, or flash tank stripping.

36. A method for the treatment of an acid gas from a gaseous stream using the alkalinity of seawater, said method comprising the steps of:
  (a) adding an amount of ozone to said seawater effective to operate as a bactericidal agent and effective for at least one of oxidizing hydrogen sulfide to sulfur dioxide and oxidizing nitrogen monoxide to nitrogen dioxide; and
  (b) absorbing said acid gas from said gaseous stream by
    (i) adding said gaseous stream to said seawater in an absorption tower for absorption of said acid gas,
    (ii) adding an amine solvent to said absorption tower effective to provide an enhanced oxidation rate of said acid gas absorbed in said absorption tower, (iii) removing at least most of said amine solvent from said seawater by stripping to produce spent seawater, and (iv) after step (iii), removing a precipitated sulfite-sulfate slurry from the spent seawater and recycling a portion of said sulfite-sulfate slurry to said absorption tower; and (c) discharging said spent seawater to the sea.

37. The method of claim 36 wherein said acid gas is hydrogen sulfide, sulfur dioxide, nitrogen monoxide, nitrogen dioxide, carbon dioxide, or a combination thereof.

38. The method of claim 36 wherein said amine solvent is isopropylamine, propylamine, diisopropylamine, ethylamine, diethylamine, methylamine, dimethylamine, or a combination thereof.

39. The method of claim 36 wherein said amine solvent is stripped from said seawater by vacuum membrane distillation, vacuum distillation, distillation, pervaporation, or flash tank stripping.

40. A method for the treatment of an acid gas from a gaseous stream using the alkalinity of formation water, said method comprising the steps of:

(a) adding a sufficient amount of oxygen to said formation water for at least one of oxidizing hydrogen sulfide to sulfur dioxide and oxidizing nitrogen monoxide to nitrogen dioxide;

(b) absorbing said acid gas from said gaseous stream by
(i) concentrating the alkalinity of said formation water by membrane distillation in a manner effective to produce increased absorption capacity,
(ii) adding said gaseous stream to said formation water in an absorption tower for absorption of said acid gas,
(iii) adding an amine solvent to said absorption tower effective to provide an enhanced oxidation rate of said acid gas absorbed in said absorption tower,
(iv) removing at least most of said amine solvent from said formation water by stripping to produce spent formation water, and
(v) after step (iv), removing a precipitated sulfite-sulfate slurry from the spent formation water, and recycling a portion of said sulfite-sulfate slurry to said absorption tower; and (c) discharging said spent formation water.

41. The method of claim 40 wherein said formation water is selected from the group consisting of oil-gas field produced waters, methane coal-bed produced waters, aquifer waters, and combinations thereof.

42. The method of claim 40 wherein said acid gas is hydrogen sulfide, sulfur dioxide, nitrogen monoxide, nitrogen dioxide, carbon dioxide, or a combination thereof.

43. The method of claim 40 wherein said amine solvent is isopropylamine, propylamine, diisopropylamine, ethylamine, diethylamine, methylamine, dimethylamine, or a combination thereof.

44. The method of claim 40 wherein said amine solvent is stripped from said formation water by vacuum membrane distillation, vacuum distillation, distillation, pervaporation, or flash tank stripping.

45. A method for the treatment of an acid gas from a gaseous stream using the alkalinity of formation water, said method comprising the steps of:

(a) adding a sufficient amount of oxygen to said formation water for at least one of oxidizing hydrogen sulfide to sulfur dioxide and oxidizing nitrogen monoxide to nitrogen dioxide;

(b) absorbing said acid gas from said gaseous stream by
(i) concentrating the alkalinity of said formation water by nanofiltration in a manner effective to produce increased absorption capacity,
(ii) adding said gaseous stream to said formation water in an absorption tower for absorption of said acid gas,
(iii) adding an amine solvent to said absorption tower effective to provide an enhanced oxidation rate of said acid gas absorbed in said absorption tower,
(iv) removing at least most of said amine solvent from said formation water by stripping to produce spent formation water, and
(v) after step (iv), removing a precipitated sulfite-sulfate slurry from the spent formation water and recycling a portion of said sulfite-sulfate slurry to said absorption tower; and (c) discharging said spent formation water.

46. The method of claim 45 wherein said formation water is selected from the group consisting of oil-gas field produced waters, methane coal-bed produced waters, aquifer waters and combinations thereof.

47. The method of claim 45 wherein said acid gas is hydrogen sulfide, sulfur dioxide, nitrogen monoxide, nitrogen dioxide, carbon dioxide, or a combination thereof.

48. The method of claim 45 wherein said amine solvent is isopropylamine, propylamine, diisopropylamine, ethylamine, diethylamine, methylamine, dimethylamine, or a combination thereof.

49. The method of claim 45 wherein said amine solvent is stripped from said formation water by vacuum membrane distillation, vacuum distillation, distillation, pervaporation, or flash tank stripping.

50. A method for the treatment of an acid gas from a gaseous stream using the alkalinity of formation water, said method comprising the steps of:

(a) adding a sufficient amount of oxygen to said formation water for at least one of oxidizing hydrogen sulfide to sulfur dioxide and oxidizing nitrogen monoxide to nitrogen dioxide;

(b) absorbing said acid gas from said gaseous stream by
(i) adding said gaseous stream to said formation water in an absorption tower for absorption of said acid gas,
(ii) adding an amine solvent to said absorption tower effective to provide an enhanced oxidation rate of said acid gas absorbed in said absorption tower,
(iii) removing at least most of said amine solvent from said formation water by stripping to produce spent formation water, and
(iv) after step (iii), removing a precipitated sulfite-sulfate slurry from the spent formation water and recycling a portion of said sulfite-sulfate slurry to said absorption tower; and (c) discharging said spent formation water.

51. The method of claim 50 wherein said formation water is selected from the group consisting of oil-gas field produced waters, methane coal-bed produced waters, aquifer waters, and combinations thereof.

52. The method of claim 50 wherein said acid gas is hydrogen sulfide, sulfur dioxide, nitrogen monoxide, nitrogen dioxide, carbon dioxide, or a combination thereof.

53. The method of claim 50 wherein said amine solvent is isopropylamine, propylamine, diisopropylamine, ethylamine, diethylamine, methylamine, dimethylamine, or a combination thereof.

54. The method of claim 50 wherein said amine solvent is stripped from said formation water by vacuum membrane distillation, vacuum distillation, distillation, pervaporation, or flash tank stripping.

55. A method for the treatment of a hazardous gas comprising at least one of an acid gas and a radioactive gas from a gaseous stream using an amine solvent as a direct absorption media, said method comprising the steps of:
(a) absorbing said hazardous gas directly by adding said amine solvent to said hazardous gas in an absorption tower and venting a treated gas stream from said absorption tower;
(b) stripping and recovering said amine solvent by
  (i) injecting water into a re-generating tower,
  (ii) heating a mixture in said re-generating tower comprising said water, said amine solvent, and absorbed gas from said absorption tower to release said absorbed gas from said mixture and produce a purified gas product,
  (iii) removing at least most of said amine solvent from said water by stripping and recycling at least a portion of said amine solvent to said absorption tower, and
  (iv) after step (iii), removing a precipitate from said water and recycling at least a portion of said water to said re-generating tower; and
(c) releasing said purified gas product from said re-generating tower.

56. The method of claim 55 wherein said acid gas is hydrogen sulfide, sulfur dioxide, nitrogen monoxide, nitrogen dioxide, carbon dioxide, or a combination thereof.

57. The method of claim 55 wherein said hazardous gas comprises at least one of radon and its daughter products.

58. The method of claim 55 wherein said amine solvent is isopropylamine, propylamine, diisopropylamine, ethylamine, diethylamine, methylamine, dimethylamine, or a combination thereof.

59. The method of claim 55 wherein said amine solvent is stripped from said water by vacuum membrane distillation, vacuum distillation, distillation, pervaporation, or flash tank stripping.

* * * * *